(12) United States Patent
Matsumoto

(10) Patent No.: US 8,899,110 B2
(45) Date of Patent: Dec. 2, 2014

(54) PEDALING MOTION MEASURING DEVICE AND PEDALING MOTION SENSOR DEVICE

(75) Inventor: Hitoshi Matsumoto, Nagaokakyo (JP)

(73) Assignee: Club Kong Co., Ltd., Nagaokakyo-shi, Kyoto (JP)

( * ) Notice: Subject to any disclaimer, the term of this patent is extended or adjusted under 35 U.S.C. 154(b) by 0 days.

(21) Appl. No.: 13/639,288

(22) PCT Filed: Mar. 31, 2011

(86) PCT No.: PCT/JP2011/058244
§ 371 (c)(1),
(2), (4) Date: Oct. 4, 2012

(87) PCT Pub. No.: WO2011/135972
PCT Pub. Date: Nov. 3, 2011

(65) Prior Publication Data
US 2013/0019700 A1 Jan. 24, 2013

(30) Foreign Application Priority Data
Apr. 28, 2010 (JP) .................................. 2010-102903

(51) Int. Cl.
| | |
|---|---|
| G01L 3/26 | (2006.01) |
| G01L 3/24 | (2006.01) |
| G01L 5/16 | (2006.01) |
| B62J 99/00 | (2009.01) |
| B62M 3/00 | (2006.01) |
| A63B 71/06 | (2006.01) |

(52) U.S. Cl.
CPC . *G01L 3/26* (2013.01); *G01L 3/242* (2013.01); *G01L 5/165* (2013.01); *B62J 99/00* (2013.01); *G01L 5/161* (2013.01); *A63B 2071/0652* (2013.01); *B62K 2207/00* (2013.01); *B62J 2099/0013* (2013.01); *B62M 3/00* (2013.01); *B62J 2099/002* (2013.01)
USPC ................ 73/379.07; 73/826.28; 73/826.321; 73/865.4

(58) Field of Classification Search
USPC ........................... 73/862.28, 379.07, 862.321
See application file for complete search history.

(56) References Cited

U.S. PATENT DOCUMENTS

| | | | | |
|---|---|---|---|---|
| 4,423,630 | A | * | 1/1984 | Morrison .................... 73/379.01 |
| 4,463,433 | A | * | 7/1984 | Hull et al. ........................ 702/41 |

(Continued)

FOREIGN PATENT DOCUMENTS

| | | | |
|---|---|---|---|
| EP | 2072387 A1 | * | 6/2009 |
| JP | 07-151620 A | | 6/1995 |
| JP | 2008-254592 A | | 10/2008 |
| WO | 89/00401 A1 | | 1/1989 |

(Continued)

OTHER PUBLICATIONS

International Search Report of PCT/JP2011/058244, mailing date of Jun. 28, 2011.

(Continued)

*Primary Examiner* — Paul West
(74) *Attorney, Agent, or Firm* — Westerman, Hattori, Daniels & Adrian, LLP

(57) ABSTRACT

The inventive pedaling motion measuring device includes: a measurement body unit having a first sensor unit for sensing the number of rotation of a wheel by sensing the motion of the wheel of a bicycle, and second sensor units arranged at right and left crank arms for sensing magnitude and direction of a force applied to each of the right and left crank arms. The first work calculation unit calculates work performed by the bicycle based on the number of rotation of the wheel sensed by the first sensor unit. The second work calculation unit calculates work provided to the crank member by the user within a prescribed time, based on the magnitude and direction of the force applied to each of the right and left crank arms and sensed by the second sensor units. The efficiency calculation unit calculates the efficiency of the bicycle.

15 Claims, 18 Drawing Sheets

(56) References Cited

U.S. PATENT DOCUMENTS

| | | | |
|---|---|---|---|
| 5,027,303 | A | 6/1991 | Witte |
| 7,418,862 | B2 * | 9/2008 | Gruben et al. ............. 73/379.07 |
| 8,011,242 | B2 * | 9/2011 | O'Neill et al. ............. 73/379.01 |
| 2007/0145709 | A1 | 6/2007 | Matsumoto |
| 2009/0119032 | A1 | 5/2009 | Meyer |
| 2009/0120208 | A1 | 5/2009 | Meyer |
| 2010/0093494 | A1 * | 4/2010 | Smith ............................... 482/8 |
| 2010/0263468 | A1 | 10/2010 | Fisher et al. |
| 2012/0017701 | A1 | 1/2012 | Meyer |

FOREIGN PATENT DOCUMENTS

| | | |
|---|---|---|
| WO | 2004/113157 A1 | 12/2004 |
| WO | 2008/058164 A2 | 5/2008 |
| WO | 2009/006673 A1 | 1/2009 |

OTHER PUBLICATIONS

Notification of Transmittal of Translation of the International Preliminary Report on Patentabililty (Form PCT/IB/338) of International Application No. PCT/JP2011/058244 mailed Dec. 13, 2012 with Form PCT/IPEA/409.

* cited by examiner

FIG. 14

| Angle | 23-1 First sensor | | | | 23-2 Second sensor | | | |
|---|---|---|---|---|---|---|---|---|
| | First displacement | Second displacement | Third displacement | Fourth displacement | First displacement | Second displacement | Third displacement | Fourth displacement |
| 0° | 0.25 | −0.22 | −1.02 | 0.62 | 0.27 | 0.22 | −1.07 | 0.62 |
| 30° | 0.45 | −0.63 | −0.80 | 0.42 | 0.43 | 0.61 | −0.83 | 0.44 |
| 60° | 0.66 | −1.05 | −0.45 | 0.21 | 0.64 | 1.10 | −0.44 | 0.20 |
| . | . | . | . | . | . | . | . | . |
| 180° | 0.20 | 0.21 | 1.16 | 0.63 | 0.20 | 0.21 | 2.36 | 0.63 |
| . | . | . | . | . | . | . | . | . |
| 240° | 0.63 | 0.61 | 0.45 | 0.32 | 0.66 | −9.05 | 0.45 | 0.31 |
| . | . | . | . | . | . | . | . | . |

PEDALING MOTION MEASURING DEVICE AND PEDALING MOTION SENSOR DEVICE

TECHNICAL FIELD

The present invention relates to a pedaling motion measuring device and a pedaling motion sensor device. In particular, the present invention relates to a sensor device that measures a force applied to each of the pedals of a bicycle, and to a pedaling motion measuring device that derives prescribed information based on the measured information.

BACKGROUND ART

Conventionally, there are various power meters that measure motive power applied to a crankset for the purpose of measuring the efficiency of pedaling performed by a user, in connection with bicycles or cycling fitness machines.

For example, Patent Document 1 (WO 89/00401 A) discloses a device in which a gauge is suspended over a drive disk (spider) and a crank arm. By measuring the distortion occurring between the drive disk (spider) and the crank by the force applied to the crank by the pedaling operation of the user, the force (torque) used for the crank to rotate is measured.

Further, Patent Document 2 (WO 2008/058164 A) discloses a power meter according to two separate embodiments, in which a distortion gauge is provided at the spider arm or at the crank arm. The power meter in each embodiment measures the force (torque) used for the crank to rotate, by measuring the distortion occurring at the spider arm or the crank arm by the force provided to the crank via the pedal.

Still further, Patent Document 3 (U.S. Pat. No. 5,027,303) discloses a device in which distortion gauges are attached to the top and bottom faces of each of the right and left crank arms. The device measures the force (torque) used for the crank to rotate by measuring the distortion occurring at the crank arms by the force provided to the crank via the pedals.

As described above, all the power meters are identical to one another in that they are each structured to measure the force used for the crank to rotate by measuring the distortion occurring at the crank and the spider by the force provided to the crank via the pedal, using the distortion gauges provided at particular portions.

PRIOR ART DOCUMENTS

Patent Documents

Patent Document 1: WO 89/00401 A
Patent Document 2: WO 2008/058164 A
Patent Document 3: U.S. Pat. No. 5,027,303

SUMMARY OF THE INVENTION

Problems to be Solved by the Invention

However, since the device of the type in which the distortion gauge is attached to the spider as disclosed in Patent Documents 1 and 2 is structured such that the spider follows the pedaling force provided to the right and left cranks at the same time, the spider measures the distortion incurred by the resultant force applied to both the right and left cranks. Accordingly, for example, even in the case where the resultant force of the force that is provided when the right crank shifts from the top dead center to the bottom dead center and the force that is provided when the left crank shifts from the bottom dead center to the top dead center acts to cancel out the forces applied to the cranks, only the distortion of the spider corresponding to the resultant force can be measured. Hence, there is a issue that the forces respectively applied to the right and left cranks cannot independently be measured.

That is, the power meter of this type cannot determine whether or not the right and left pedaling operations are out of balance, and whether or not the right and left pedaling forces do not cancel out each other. Thus, it cannot be satisfactory for determining whether or not efficient pedaling is carried out.

Further, the device having the structure in which the distortion gauge is attached to each of the crank arms as disclosed in Patent Documents 2 and 3 is free of the issue described above, and the forces respectively applied to the right and left pedals can individually be measured by the distortion gauges provided at the crank arms.

However, the power meters noted above each measure the torque that is used for the crank to rotate, and cannot measure how the force is exerted to the crank. In connection with the pedaling operation of the bicycle, the force exerted to the pedals and the force actually used for the crank to rotate are not identical to each other. Though the purpose of applying force to the pedal is to rotate the crank, not the whole force exerted to the crank is used for the crank to rotate, and actually the exerted force incurs a loss.

With reference to FIG. 19, a description will be given of the force exerted to the crank. As shown in FIG. 19, in the case where the forces represented by the vectors are applied to a pedal 100 provided on the tip side of the crank, the torque is obtained by f1·L1, f2·L2 .... When the magnitude of each of forces f1 to f4 is constant, the torque of f3 and L3 at which the crank arm is the longest becomes the maximum. Further, the proportion of each of L1, L2, and L4 to L3 is L1=L3 cos 60 (about 0.5 times as great as L3), L2=L3 cos 30 (about 0.87 times as great as L3), and L4=L3 cos 30 (about 0.87 times as great as L3). That is, when respective directions of f1 to f4 are displaced by 30, the effective torque is calculated as follows: f1·L1 is 50; f2·L2 is 87; f3·L3 is 100; and f4·L4 is 87. Accordingly, based on calculations, it can be seen that the force is unused for rotation and wasted by 13 when the force is displaced by 30 degrees relative to an axis; and by 50 when displaced by 60 degrees.

From the foregoing, all the conventional power meters disclosed in the above Patent Documents are the devices for measuring solely the force that rotated the crank arms, and cannot measure whether or not the force exerted to the crank, i.e., the pedals, efficiently rotates the crank arms. This difference is recognized as the pedaling skill, which can serve as a barometer indicating how efficiently the force exerted to the pedal is used for the rotation of the crank. Therefore, there is a demand for a power meter that can obtain the output result of the force used to rotate the crank.

Accordingly, in consideration of the foregoing issue, an object of the present invention is to provide a measuring device and a sensor device that can obtain a measurement result as to whether or not the force is efficiently used for rotating the crank arm for each of the right and left pedaling operations.

Means for Solving the Problem

In order to achieve the object stated above, the present invention is structured as follows. In accomplishing these and other aspects, according to a first aspect of the present invention, there is provided a pedaling motion measuring device comprising:

a measurement body unit that has a first sensor unit for sensing a number of rotation of a wheel by sensing a motion of the wheel of a bicycle provided with a crank member having a right and left pair of crank arms connected by a hanger shaft and pedals, the measurement body unit further having second sensor units arranged at the right and left crank arms for sensing magnitude and direction of a force applied to each of the right and left crank arms;

a first work calculation unit that calculates work performed by the bicycle based on the number of rotation of the wheel sensed by the first sensor unit;

a second work calculation unit that calculates user's work provided to the crank member by a user, based on the magnitude and direction of the force applied to each of the right and left crank arms and sensed by the second sensor units; and an efficiency calculation unit that calculates an efficiency of the bicycle based on the work of the bicycle and the user's work.

According to a second aspect of the present invention, there is provided a pedaling motion measuring device of 1st aspect, wherein the first work calculation unit calculates the work of the bicycle based on information on a distance traveled by the bicycle, the information being based on the number of rotation of the wheel.

According to a third aspect of the present invention, there is provided a pedaling motion measuring device of 1st aspect, wherein the second work calculation unit calculates the user's work, based on a value of a force applied in a rotation tangential direction of each of the right and left crank arms.

According to a fourth aspect of the present invention, there is provided a pedaling motion measuring device of 1st aspect, wherein the first sensor unit is structured with a magnetic sensor provided at each of the wheel of the bicycle and an opposing member being stationary relative to the wheel.

According to a fifth aspect of the present invention, there is provided a pedaling motion measuring device of 1st aspect, wherein the second sensor units each include an angle sensor measuring angle positions of corresponding one of the crank arms rotated by an operation of the user, and a plurality of force sensors each measuring a force applied to the crank member based on a distortion of the crank member, the second sensor units outputting information on the force applied to the crank member in association with the angle positions of the crank arms.

According to a sixth aspect of the present invention, there is provided a pedaling motion measuring device of 5th aspect, wherein a plurality of the force sensors of the second sensor units are radially arranged about a rotation center of the hanger shaft between the right and left crank arms and the hanger shaft.

According to a seventh aspect of the present invention, there is provided a pedaling motion measuring device of 5th aspect, wherein the second sensor units are each structured with a 6-axis sensor that can measure 3-axis directional forces and 3-axis directional moments being perpendicular to one another.

According to an eighth aspect of the present invention, there is provided a pedaling motion measuring device of 5th aspect, wherein a plurality of the force sensors of the second sensor units are each a capacitive force sensor.

According to a ninth aspect of the present invention, there is provided a pedaling motion measuring device of 5th aspect, further comprising a vector calculation unit that calculates magnitude and direction of the force applied to the crank member by an operation of the user, based on an output from each of the sensor units.

According to a tenth aspect of the present invention, there is provided a pedaling motion measuring device of 9th aspect, wherein the vector calculation unit calculates magnitude of a force of a particular component out of the entire force applied to the crank member.

According to an eleventh aspect of the present invention, there is provided a pedaling motion measuring device of 5th aspect, wherein the distortion sensors are provided at opposing faces along rotation directions of the respective crank arms so as to oppose to each other in a direction crossing a rotary shaft of the crank member.

According to a twelfth aspect of the present invention, there is provided a pedaling motion measuring device of 5th aspect, wherein the first work calculation unit calculates magnitude and direction of the force applied to the crank member by comparing reference distortion information previously stored as an output value of each of the force sensors when a certain force is applied from a certain direction to each of the crank arms at each of the angle positions against an output value from each of the force sensors.

According to an thirteenth aspect of the present invention, there is provided a pedaling motion measuring device of 5th aspect, wherein the crank arms each include a straight portion along a radial direction of a rotary shaft of the crank member and a crossing portion extending to cross the radial direction of the rotary shaft of the crank member; and the distortion sensors of the sensor units are provided to each of the straight portion and the crossing portion.

According to a fourteenth aspect of the present invention, there is provided a pedaling motion sensor device, comprising:

an angle sensor that measures angle positions of crank arms of a crank member being rotated by an operation of a user;

a sensor unit that is provided with a plurality of force sensors arranged radially about a rotation center of a hanger shaft between the right and left crank arms and the hanger shaft; and a vector calculation unit that calculates magnitude and direction of a force applied to the crank member by the operation of the user, by associating positional information measured by the angle sensor and an output of each of the force sensors of the sensor unit with each other.

Effect of the Invention

According to the present invention, the efficiency of the bicycle can be derived by: calculating the work performed by the bicycle based on the movement of the wheel of the bicycle; on the other hand, obtaining the work performed by the user to the crank arm to rotate the crank arm; and comparing the work results against with each other. In calculating the efficiency of the bicycle, the common factors such as the weight of the bicycle including the user can be canceled out, and calculation can be made easier.

Further, since the sensor unit is provided to each of the right and left pair of crank arms, the vectors of the force applied to each of the crank arms can be calculated. Accordingly, the force used for rotating the crank member can be derived from the vectors of the force exerted to the crank member.

In the present invention, the efficiency of the bicycle is one of the indexes for measuring to what extent the force that is effective to rotate the crankset and that is exerted by the pedaling motion performed by the user is efficiently used for allowing the bicycle to travel. The efficiency of the bicycle can be obtained by, for example, based on the power (workload/time) actually performed by the bicycle that is measured over a certain time in which the average speed is uniform and the power used for rotating the crankset. The force applied to the crankset by the user pressing down the pedal is influenced by the pedaling skill of the user or the attitude of the user corresponding to the user's frame in the bicycle motion mode, and the rotational resistance of the crank corresponding to the user's muscle strength. Further, part of the force applied to the crank is converted into the deflection or the like of various members such as the frame, the crank, and the chain, and therefore, it is not used for allowing the bicycle to travel. In the present application, of the entire force exerted to the crankset, the proportion of the work attributed to the force actually used for allowing the bicycle to travel and the work actually performed by the bicycle is defined as the efficiency of the bicycle, and is employed as one of the performance evaluation indexes of the bicycle itself.

By performing comparison using the efficiency of the bicycle as an index, the user can take it as the indication in selecting the parts of the bicycle suited for himself/herself. That is, when a part of the bicycle is replaced, by comparing the bicycle efficiency between before and after the replacement, the user can take it as the indication for determining whether or not the bicycle part suits for the pedaling skill, frame or the like of the user himself/herself.

The work actually performed by the bicycle is derived, for example, based on the total weight of the bicycle and the user that actually travel, and the number of rotation of the wheel of the bicycle. In most cases, the total weight of the bicycle and the user is the same and, therefore, the work can specifically be calculated by the traveling distance of the bicycle. As one example, the work performed by the bicycle can be derived using the information on the distance traveled by the bicycle in a prescribed time, based on the number of rotation of the wheel measured by the magnetic sensor or the like attached to the wheel. Further, the work applied to the crank can be derived by determining in which direction and what magnitude the user is applying the force in accordance with the angle position of the crank that performs the rotation motion, and employing the total value of the force components in the tangential directions corresponding to the angle positions of the crank performing the rotation motion as the workload of the user.

Further, the vectors in accordance with the angle positions can be measured by using the angle sensor and a plurality of force sensors as the second sensor units for sensing the magnitude and directions of the force applied to the right and left crank arms. By arranging the force sensors in a radial manner about the rotation center of the hanger shaft between the right and left crank arms and the hanger shaft, the vectors can precisely be measured. Further, by employing a capacitive sensor as each of the force sensors, a reduction in the power consumption and in the size and weight of the device can be achieved.

BRIEF DESCRIPTION OF THE DRAWINGS

These and other aspects and features of the present invention will become clear from the following description taken in conjunction with the preferred embodiments thereof with reference to the accompanying drawings

FIG. 14 is a table showing one example of the reference distortion information of the right sensor unit.

MODES FOR CARRYING OUT THE INVENTION

Figure 1:
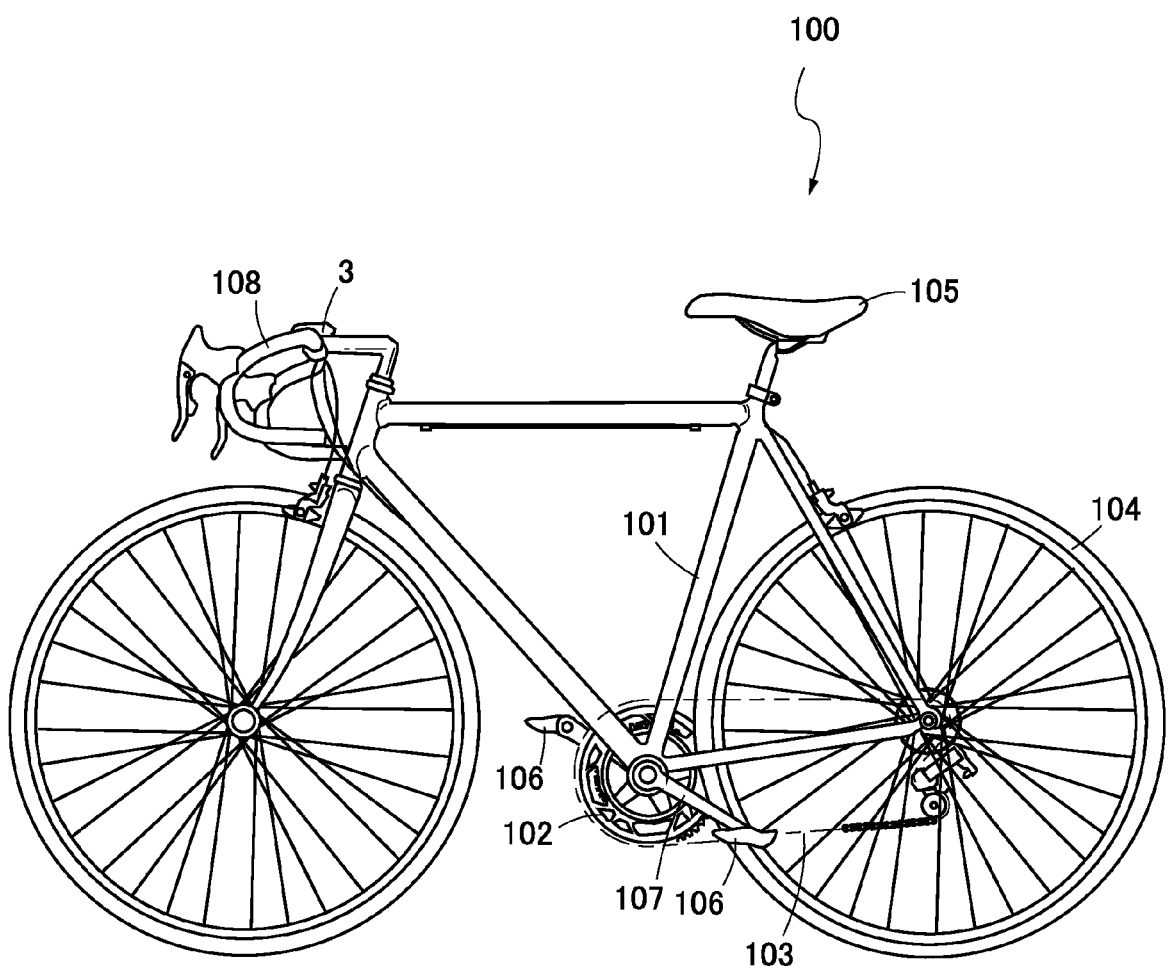
FIG. 1 is a schematic view showing the structure of a bicycle in which a pedaling motion measuring device according to an embodiment of the present invention is installed.

Before the description of the present invention proceeds, it is to be noted that like parts are designated by like reference numerals throughout the accompanying drawings. In the following, with reference to the drawings, a detailed description will be given of a first embodiment of the present invention.

First Embodiment

FIG. 1 is a schematic view showing the structure of a bicycle in which a pedaling motion measuring device according to the first embodiment of the present invention is installed. The pedaling motion measuring device according to the present embodiment is installed in a bicycle or a cycling fitness machine, and measures the force applied to the pedals by the pedaling motion performed by the user, and to what extent the force applied to the pedals is efficiently used for allowing the bicycle to run.

The bicycle 100 shown in FIG. 1 is provided, at a frame 101, with a crankset 102 as one example of the crank member of the present invention, and allows a rear wheel 104 to rotate via a chain 103 to run. The user sitting on a saddle 105 puts the feet on pedals 106 which are positioned on the right and left sides of the crankset 102, respectively, to rotate the crankset 102. This incurs a prescribed rotational resistance for rotating the crankset because of the structure of the crankset and a rear wheel sprocket. When the user rotates the crankset 102 against the rotational resistance, a distortion occurs at the crankset 102 in accordance with the force applied by the user.

The pedaling motion measuring device according to the embodiments of the present invention measures the force applied by the user to the crankset 102 and its direction by measuring the distortion occurring at the crankset 102. Further, the pedaling motion measuring device displays the measurement result on a calculation device 3 attached to a handlebar 108. Still further, based on the force and its directions (vectors) applied to the crankset, the pedaling motion measuring device calculates the work applied to the crankset, and compares against the work of the bicycle obtained from the traveling distance of the bicycle, which will be described later, to thereby measure the efficiency of the bicycle. These procedures will be detailed later.

Figure 2:
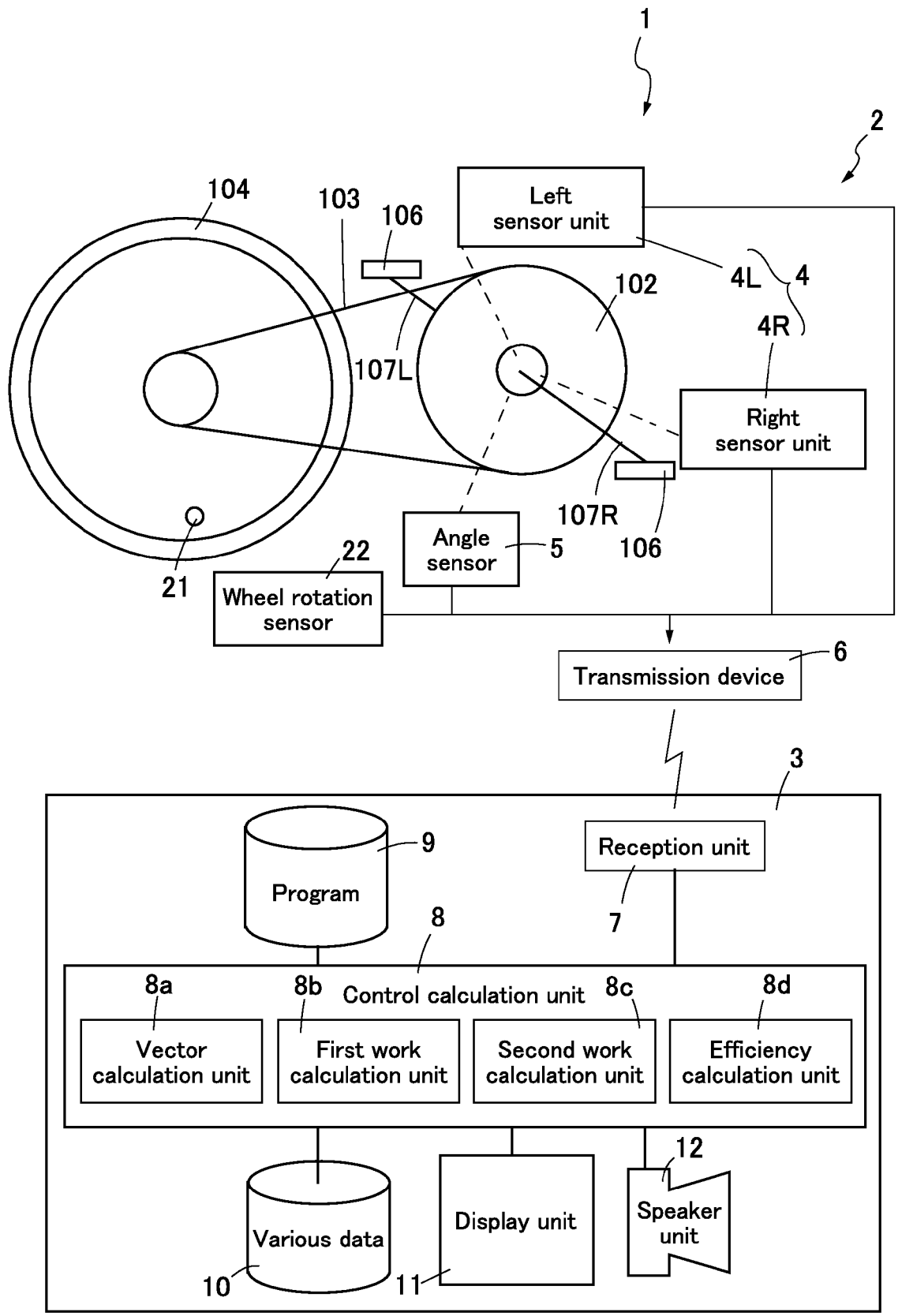
FIG. 2 is a functional block diagram showing the structure of the pedaling motion measuring device according to the embodiment of the present invention.

FIG. 2 is a functional block diagram showing the structure of the pedaling motion measuring device shown in FIG. 1. The pedaling motion measuring device 1 according to the present embodiment is structured with a measurement device 2 attached to the frame 101 and the crankset 102 of the bicycle, and the calculation device 3 attached to the handlebar 108.

The measurement device 2 includes: right and left sensor units 4 (4R, 4L) attached to the right and left crank arms of the crankset 102, respectively; an angle sensor 5 for detecting the rotation angle position of the crank arms of the crankset; a magnetic element 21 attached to the rear wheel of the bicycle; and a transmission device 6 for transmitting the output signal of a wheel rotation sensor 22 attached to the frame of the bicycle and the angle sensor 5 to the calculation device 3. It is to be noted that the right and left sensor units (4R, 4L) and the angle sensor 5 for detecting the rotation angle position of the crank arms of the crankset are one example of the second sensor units of the present invention, and the magnetic element 21 and the wheel rotation sensor 22 are one example of the first sensor unit of the present invention.

The communication among the sensors 4L, 4R, 5, and 22 and the transmission device 6 is performed via wireless communication, and further, the communication between the transmission device 6 and the calculation device 3 is also performed via wireless communication.

The calculation device 3 calculates, based on the output signal from the measurement device 2, the force applied to the crankset by the user and the bicycle efficiency, and outputs the result. The calculation device 3 includes a reception unit 7, a control calculation unit 8, programs and various data 9, reference distortion information 10 being the reference data for force calculation, a display unit 11, and a speaker unit 12. The control calculation unit 8 has functional blocks corresponding to the respective computation purposes, namely, a vector calculation unit 8a, a first work calculation unit 8b, a second work calculation unit 8c, and an efficiency calculation unit 8d. The programs and various data 9 and the reference distortion information 10 are stored in a not-shown storage device provided in the calculation device 3.

Figure 3:
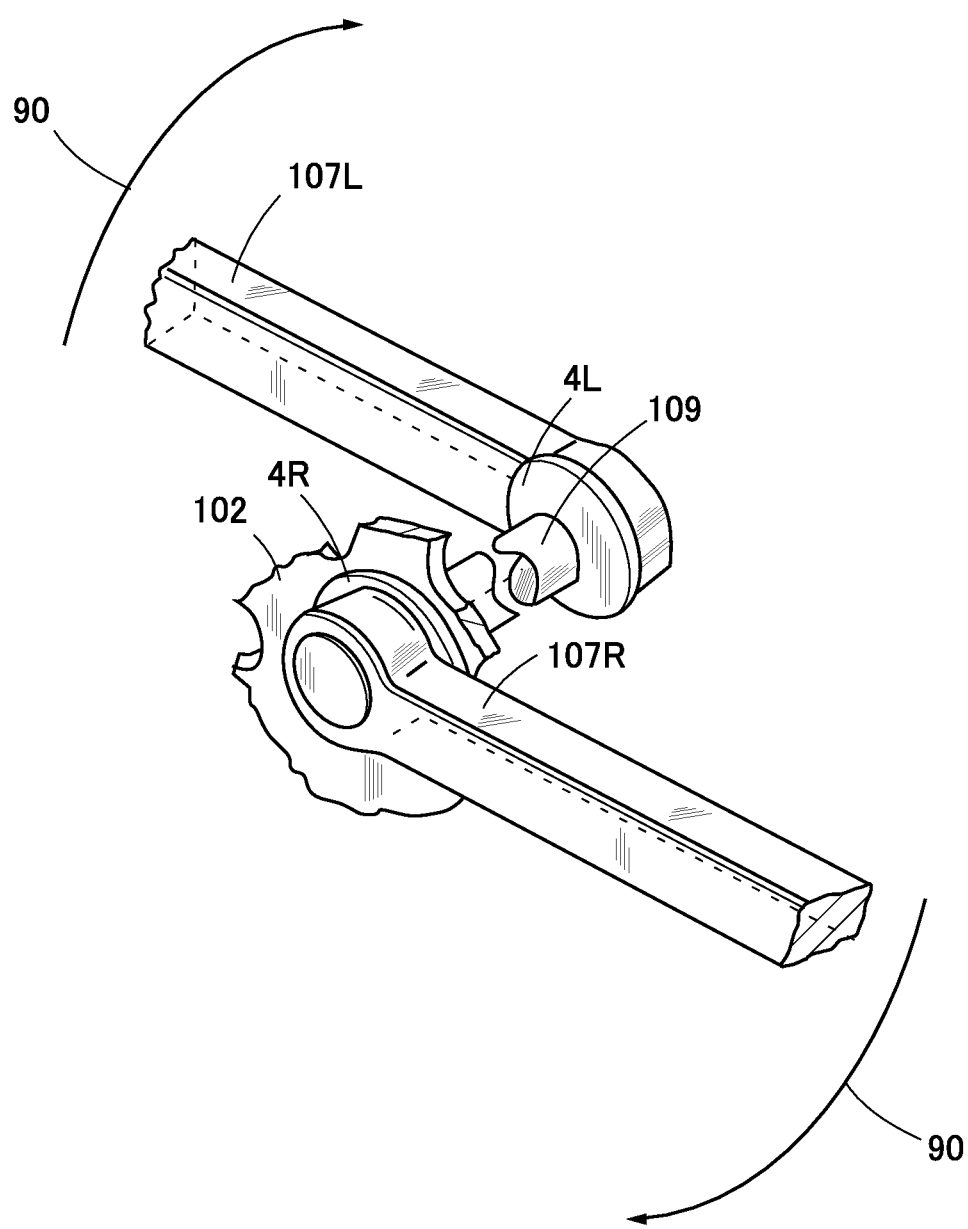
FIG. 3 is a partial enlarged perspective view of a crankset of a bicycle in which a measurement unit of a pedaling motion measuring device according to a first embodiment of the present invention is installed.

First, a description will be given of calculation of the magnitude and directions (vectors) of the force applied to the crankset. FIG. 3 is a partial enlarged perspective view of the crankset of the bicycle in which the measurement unit of the pedaling motion measuring device according to the first embodiment of the present invention is installed. In the present embodiment, the sensor units 4 measure the magnitude and directions (vectors) of the force applied to crank arms 107L and 107R.

Figure 4:
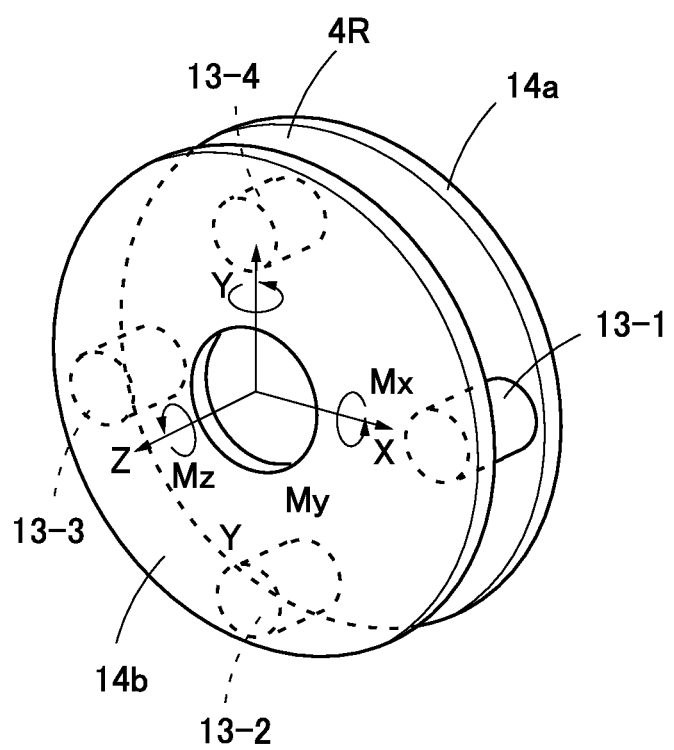
FIG. 4 is a perspective view showing the structure of a sensor unit provided to the crankset shown in FIG. 3.
Figure 5:
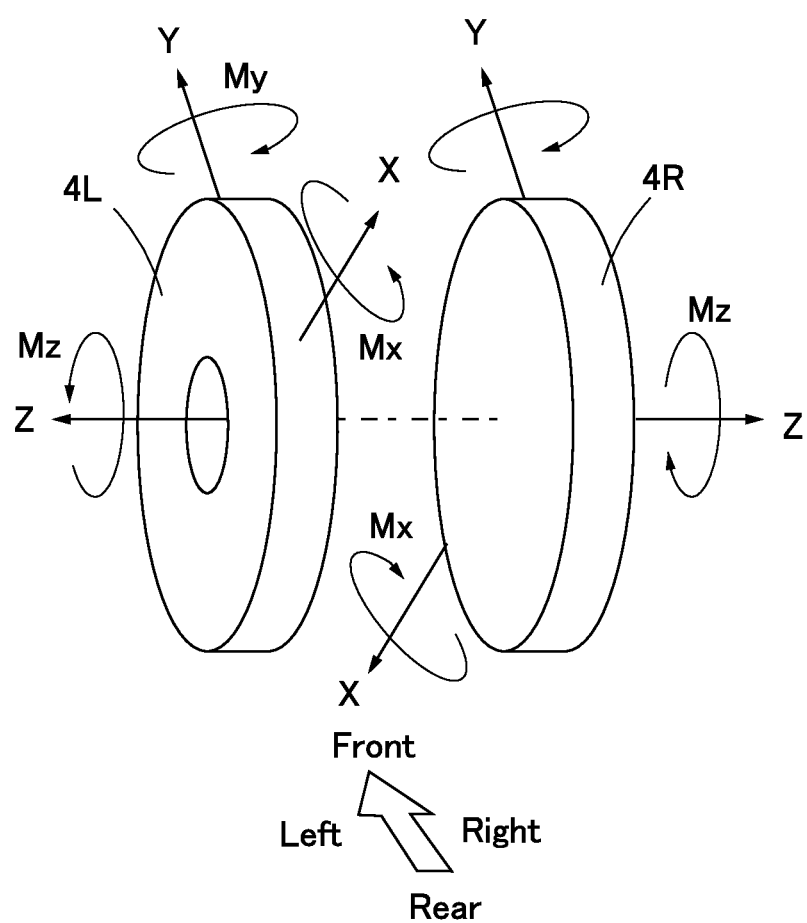
FIG. 5 shows the arrangement image of the sensor units shown in FIG. 4.

FIG. 4 is a perspective view showing the structure of the sensor unit provided to the crankset shown in FIG. 3. FIG. 5 shows the arrangement image of the sensor units shown in FIG. 4.

Figure 6:
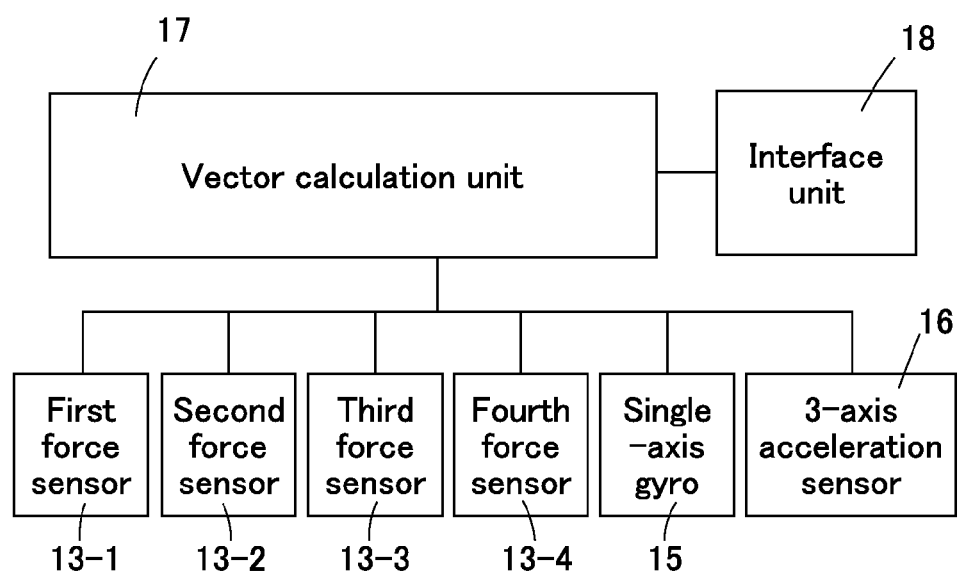
FIG. 6 is a functional block diagram showing the structure of the sensor unit shown in FIG. 4.

FIG. 6 is a functional block diagram showing the structure of the sensor unit shown in FIG. 4.

As shown in FIG. 3, the sensor units 4 (4R, 4L) are each a 6-axis force sensor having a disc-like shape being flat in the thickness direction. The sensor units 4 each can measure XYZ three-axis directional forces Fx, Fy, and Fz being perpendicular to one another and moments Mx, My, and Mz about the three axes, respectively. The sensor units 4 (4R, 4L) are attached between a hanger shaft 109 and the right and left crank arms 107 (107R, 107L), respectively.

As shown in FIGS. 4 and 6, the sensor units 4 (4R, 4L) are each structured such that first to fourth 3-axis force sensors 13-1, 13-2, 13-3, and 13-4 are installed between two supporters 14a and 14b arranged to oppose to each other. The supporters 14a and 14b are fixed to the hanger shaft 109 and the crank arm 107R, respectively. The force applied between the crank arms 107R and 107L and the hanger shaft 109 is transferred to the 3-axis force sensors 13-1, 13-2, 13-3, and 13-4 via the supporters 14a and 14b.

It is to be noted that the 3-axis force sensors 13-1, 13-2, 13-3, and 13-4 may directly be coupled to the connecting faces of the crank arms 107R and 107L relative to the hanger shaft 109. In this case, the sensor units 4 (4R, 4L) may not include the supporter 14b provided on the crank arm 107R or 107L side.

Further, as shown in FIG. 6, the sensor units 4 (4R, 4L) are provided with a gyro element 15 and a 3-axis acceleration sensor 16 as the example of the angle sensor 5, whose description will follow, a calculation unit 17 that calculates vectors of 6-axis directions and the angle of the sensor units 4 (4R, 4L), and an interface unit 18 for transmitting the output value from the calculation unit 17 to the transmission device 6.

The calculation unit 17 calculates, based on the output value from each of the 3-axis force sensors 13-1, 13-2, 13-3, and 13-4 whose description will follow, vectors of 6-axis directions being the output value from the sensor units 4 (4R, 4L). The calculation unit 17 also calculates, based on the output value from each of the gyro element 15 and the 3-axis acceleration sensor 16, information on the angle of the sensor units 4 (4R, 4L).

The first to fourth capacitive force sensors 13-1, 13-2, 13-3, and 13-4 installed in each of the sensor units 4 (4R, 4L) are each a sensor that can measure three-axis directional forces being perpendicular to one another, based on the distortion that is incurred by the force being applied. For example, a capacitive three-axis force sensor (available from WACOH-TECH Inc.) or the like can suitably be used.

In the sensor units 4 (4R, 4L), the coordinates representing respective axes of forces are defined as shown in FIGS. 4 and 5. It is defined that, with reference to the hanger shaft 109, the axis along which the crank arm extends is referred to as X axis; the axis being perpendicular to the crank arm on the plane along the plane on the supporters 14a and 14b is referred to as Y axis; and the axis along the hanger shaft 109 is referred to as Z axis. In connection with the respective axes, the positive direction for X axis and Y axis is the direction away from the hanger shaft 109, while the positive direction for Z axis is the direction away from the frame of the bicycle. By the cycling motion being performed, the sensor units 4 (4R, 4L) rotate about the Z axis.

In the present embodiment, as the first to fourth force sensors 13-1, 13-2, 13-3, and 13-4 provided to each of the sensor units 4, capacitive force sensors are employed for suppressing power consumption. The first to fourth force sensors 13-1, 13-2, 13-3, and 13-4 are radially arranged about the hanger shaft 109. Such an arrangement makes it possible to measure the 6-axis directional forces (Fx, Fy, Fz, Mx, My, Mz) applied between the supporters 14a and 14b, based on the output value of the four 3-axis sensors.

For example, in the case where the force is applied in the direction along X axis between the supporters 14a and 14b, the four force sensors 13-1, 13-2, 13-3, and 13-4 each output the detection value in X axis direction. In this manner, in the case where the force is applied in each of XYZ axis directions, the four force sensors 13-1, 13-2, 13-3, and 13-4 indicate the same output values.

Figure 7:
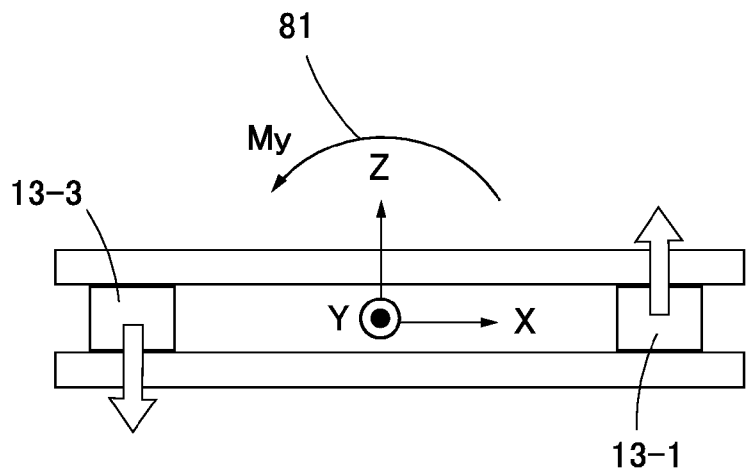
FIG. 7 is a diagram showing a force applied to force sensors when a moment in Y axis direction is applied to the sensor unit shown in FIG. 4.

On the other hand, as shown in FIG. 7, for example when moment My in Y axis direction represented by arrow 81 is applied, the forces applied to the two force sensors 13-1 and 13-3 arranged in X axis direction are counter to each other with reference to Z axis. That is, the moments (Mx, My) to the axes along the main surfaces of the supporters 14a and 14b can be measured by the two force sensors arranged to oppose to each other indicating output values which are different from each other with reference to Z axis direction.

Figure 8:
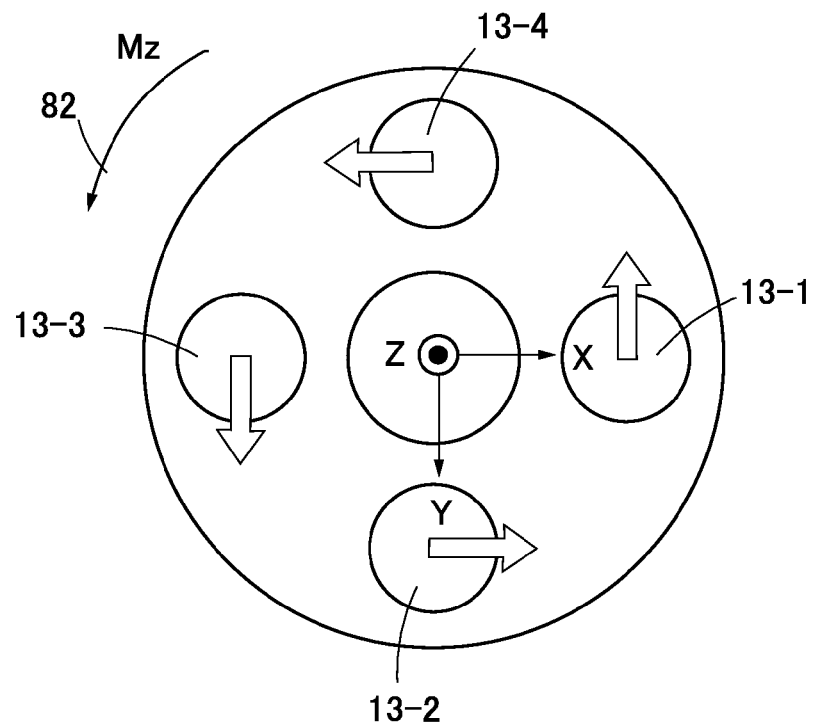
FIG. 8 is a diagram showing a force applied to the force sensors when a moment in Z axis direction is applied to the sensor unit shown in FIG. 4.

Further, as shown in FIG. 8, when moment Mz in Z axis direction represented by arrow 82 is applied, the four force sensors 13-1, 13-2, 13-3, and 13-4 indicate outputs of the directions being different from one another.

The output values from the four force sensors 13-1, 13-2, 13-3, and 13-4 are input to the calculation unit 17, such that the calculation unit 17 calculates 6-axis directional vector values and outputs to the outside. Based on the output values of the four force sensors existing between the supporter 14a and the supporter 14b that are output upon receipt of the pedaling force exerted by the user, the 6-axis directional vectors applied to the crank arm can be measured.

The structure of the angle sensor 5 is not particularly limited so long as it can detect the angle position of the crank arms of the crankset 102. In the present embodiment, the angle sensor 5 employs the gyro element 15 and the 3-axis acceleration sensor 16 provided to the sensor units 4. In connection with the angle position of the crank arms detected by the angle sensor 5, for example, intermittent angle positions may be detected. In the present embodiment, the angle position can be measured by one degree. It is to be noted that, since the right and left crank arms 107R and 107L are normally provided such that an angle difference of 180 degrees is formed, the angle sensor 5 may be installed solely in one of the sensor units.

The right and left sensor units 4 integrate the angular speed obtained by the gyro element 15, to detect the rotation angle.

Further, the calculation unit 17 of the sensor unit 4 associates the XYZ 3-axis directional forces and the moments about respective axes with one another and outputs them, in accordance with the outputs from the four force sensors. Processing of the outputs from the sensor unit 4 is governed by the interface unit 18.

The transmission device 6 receives an output signal from the interface unit 18 from the right and left sensor units 4 (4R, 4L) and transmits the signal to the calculation device 3. The transmission device 6 is arranged at the position near the right and left sensor units 4 (4R, 4L), for example, at the spider 116 of the front wheel sprocket or at the position at the frame near the hanger shaft 109. It is preferable that communication means by the transmission device 6 to the calculation device 3 is wireless communication, and any known communication method can be used. It is to be noted that, as the communication means between the transmission device 6 and the calculation device 3, wire communication may be used.

The output signal transmitted from the transmission device 6 is received by the reception unit 7 of the calculation device 3, and is transmitted to the control calculation unit 8. The control calculation unit 8 calculates the magnitude and direction of the force applied to the right and left crank arms 107R and 107L at their respective angle positions from the output signal, based on the programs 9 and the various data 10 stored in the device. The calculation of the magnitude and direction of the force applied to the right and left crank arms 107R and 107L and a variety of processing are governed by the vector calculation unit 8a of the control calculation unit 8.

In the crankset 102, the pedaling force of the user is applied to the pedals 106, and stress is applied to the crank arms 107 (107R, 107L) by the pedaling force. As has been described above, the sensor units 4 (4R, 4L) are provided between the hanger shaft 109 and the right and left crank arms 107 (107R, 107L), respectively. Here, conversion is required to obtain the pedaling force of the user at a point of effort 117 on each pedal 106 based on the output at the center of the sensor unit. The vector calculation unit 8a performs this conversion processing. The vector calculation unit 8a performs the conversion processing based on the output value from the sensor units 4 (4R, 4L) into the pedaling force of the user.

Figure 9:
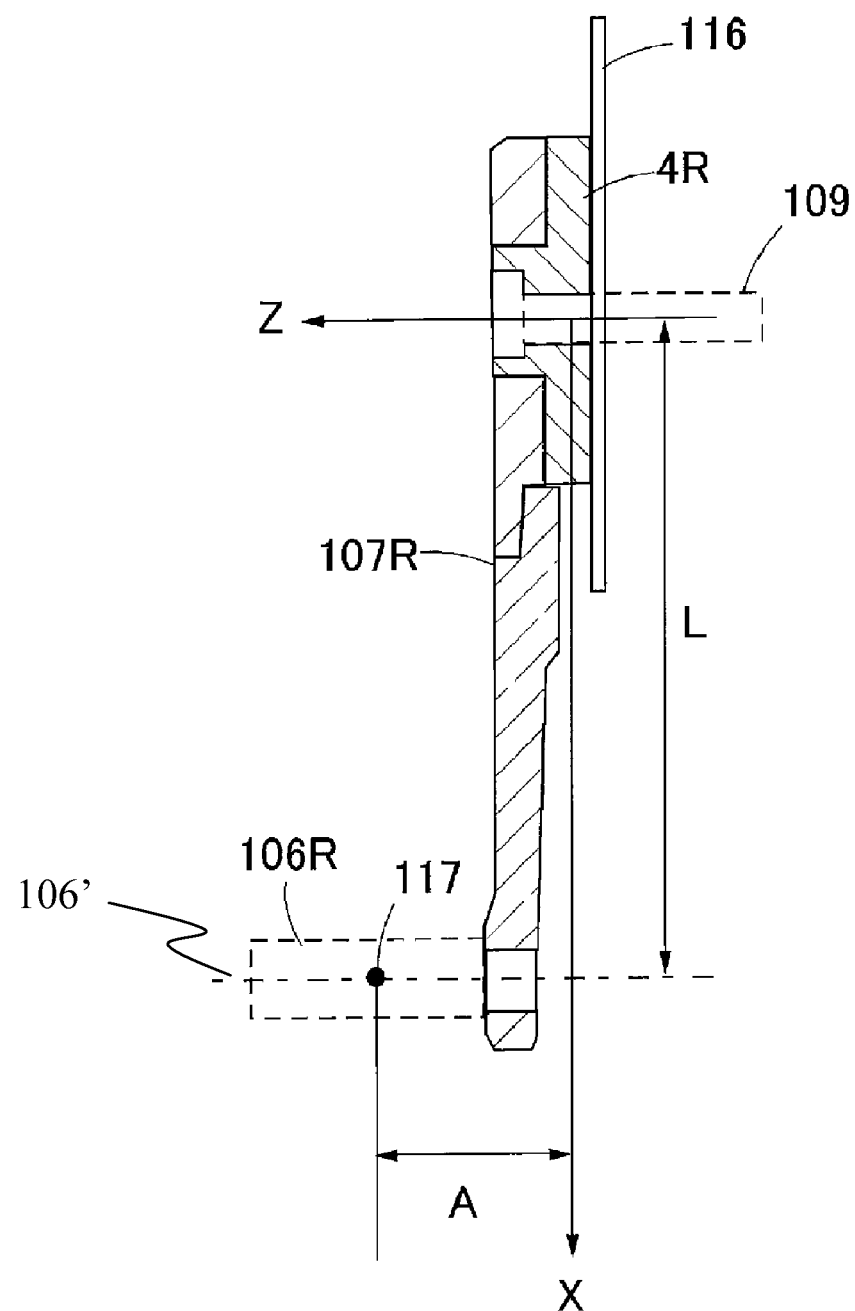
FIG. 9 is a schematic view showing the relationship between the sensor unit and the point of effort.

A description will be given of the conversion processing performed by the vector calculation unit 8a. FIG. 9 is a schematic view showing the relationship between the sensor unit and the point of effort. As shown in FIG. 9, with the crankset according to the present embodiment, since the crankshaft extends along X axis, the position of the point of effort 117 on Y axis is 0. Hence, based on the information on X coordinate (length L of the crankshaft) and Z axis coordinate (Mx rotation center, that is, distance A from X axis to the point of effort), the three-dimensional position of the point of effort with reference to the sensor is specified. As shown in FIG. 9, pedal 106R rotates along a pedal shaft 106'. The pedal shaft 106' is parallel to the hanger shaft 109.

Conversion of the 3-axis directional moments (Mx, My, Mz) output from the sensor units 4 (4R, 4L) into the pedaling forces (Fmx, Fmy, Fmz) at the point of effort 117 can be derived by the following equations:

$$Fmx = Mx/A$$

$$Fmy = My/(A^2+L^2)^{1/2}$$

$$Fmz = Mz/L$$

Further, since the sum of the forces provided by the user to the pedals 106R and 106L is the pedal pedaling force, it is defined as the resultant of forces of all the vectors. Each of the right and left pedal pedaling forces can be derived from the following equation:

$$Ft=(Fx^2+Fy^2+Fz^2)^{1/2}$$

The crankset 102 performs the rotation motion about the hanger shaft 109, and the component used for the rotation of the crankset out of the pedal pedaling force applied to the crankset is the force in the rotation tangential direction at the pedal position, that is, the component of moment force Mz about Z axis of the hanger shaft detected at the sensor unit. Accordingly, Fmz is the rotation effective pedaling force. On the other hand, as shown in FIG. 5, Fmz has directions. Defining that the rotation effective pedaling force of the right crank is Fer and the rotation effective pedaling force of the left crank is Fel, their respective rotation effective pedaling forces can be represented by the following equations:

$$Fer=-Fmz$$

$$Fel=Fmz$$

Further, the sum Fe of the rotation effective pedaling forces of the right and left cranks can be obtained by addition of them.

Further, as shown in FIG. 9, since the point of effort 117 is positioned on the outer side with reference to X axis of the sensor unit, by pressing down the pedal 106, the force that inwardly pushes the crank arm is measured. This component is measured as My (or Fmy).

Figure 10:
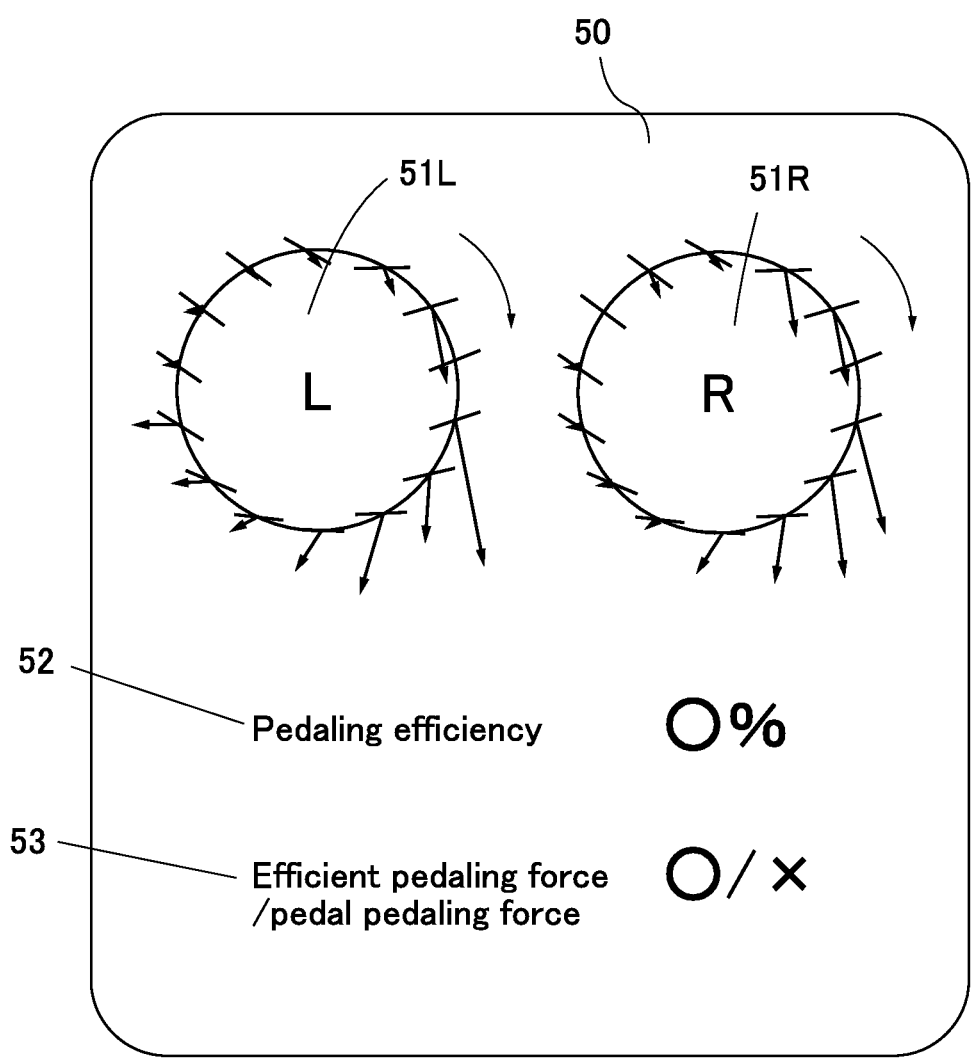
FIG. 10 is a diagram showing an output example showing the vectors of the force applied by the user that are calculated by the pedaling motion measuring device according to the present embodiment.

FIG. 10 is a diagram showing the output display example showing the vectors of the force applied by the user that are calculated by the pedaling motion measuring device according to the present embodiment. The display screen 50 shows vector representations 51 of pedaling, in which resultant vectors of Fx and Fmz are displayed along the tracks of the right and left pedals. Length Fb of the vector displayed herein is calculated by $(Fx^2+Fmz^2)^{1/2}$, and the direction of the vector to be displayed can be obtained by arcsin (Fx/Fb).

Further, the display screen displays, as the efficiency of pedaling 52 and a specific numerical value, the ratio 52 between the pedal pedaling force Ft and the rotation effective pedaling force Fe and a numerical value 53 are displayed.

With the pedaling motion measuring device according to the present embodiment, as shown in FIG. 10, the magnitude and direction of the force applied to the crankset 102 by the user in accordance with the angle position can be obtained. That is, by measuring the vectors of the pedaling force of the pedals, the efficiency of the force applied to the pedals can be measured.

With the pedaling motion measuring device according to the present embodiment, the particular component of the force applied to the pedal, for example, the rotation effective pedaling force used to rotate the crankset 102 can be evaluated, and the extent of the wasted force out of the force applied to the pedal to be used to rotate the crankset 102 can be evaluated. Thus, the pedaling skill of the user can be evaluated.

Next, a description will be given of calculation of the efficiency of the bicycle. The pedaling motion measuring device according to the present embodiment can perform, in addition to the above-described measurement of the pedaling operation performed by the user, calculation of the efficiency of the bicycle. The efficiency of the bicycle is one of the indexes for measuring to what extent the force applied to the crankset by the user is efficiently used for causing the bicycle to travel, and it is derived based on the power applied to the crankset by the user and the distance that the bicycle has traveled. Specifically, the power produced by the bicycle is calculated, and on the other hand, calculation is performed based on the power produced by the user to the crank arm for rotating the crank arm.

By calculating the efficiency of the bicycle, for example, the indication of whether or not the parts of the bicycle such as the frame, the saddle and the like are fit for the cycling style of the user himself/herself can be obtained. This can serve as one of the criteria of selecting the parts.

The work provided by the user to the crankset 102 is calculated based on the vectors applied to the crankset 102 that are derived by the vector calculation unit 8a described above. On the other hand, as to the distance that the bicycle has traveled is calculated based on the number of rotation of the wheel 104 of the bicycle.

The work Pb performed by the bicycle is calculated by the first work calculation unit 8b based on the traveling distance of the bicycle. Generally, the work is defined by the distance traveled by an object of a prescribed weight. Therefore, provided that the total weight of the bicycle and the user is identical, the traveling distance can serve as the indication of the work of the bicycle. The traveling distance of the bicycle is a product of the traveling distance per rotation of the wheel and the number of rotation. The power of the bicycle is measured by measuring the number of rotation per unit time.

In the present embodiment, as shown in FIG. 2, the number of rotation of the wheel is calculated by the magnetic element 21 provided at the rear wheel and the wheel rotation sensor 22. The wheel rotation sensor 22 is provided at the frame of the bicycle so as to oppose to the magnetic element 21, whereby the number of times that the magnetic element 21 passes through the position where it opposes to the wheel rotation sensor 22 by the rotation of the wheel can be measured. In connection with the traveling distance of the bicycle, the number of rotation of the wheel within a prescribed time required for measurement is counted, and the number of rotation is multiplied by the dimension of the rear wheel (inch values or the traveling distance per rotation). Thus, the power Pb of the bicycle is calculated.

It is to be noted that, the number of rotation of the rear wheel of the bicycle varies depending on the gear ratio of the rear wheel sprocket and the crankset. Therefore, when the gear ratio is constant, the power of the bicycle may be calculated based on the number of rotation of the crankset.

Next, a description will be given of calculation of the work provided by the user to the crankset 102. As has been described in the foregoing, processing of the work provided by the user to the crankset 102 is governed by the second work calculation unit 8c based on the vectors of components applied to the crankset 102 by the pedaling operation of the user calculated by the vector calculation unit 8a. As has been described in the foregoing, out of the sum of force Ft provided to the crankset, the component that is used for rotating the crankset and that is effective to cause the bicycle to travel is the component of moment force Mz about Z axis, while the other component forces do not contribute to the work. As has been described in the foregoing, the rotation effective component Mz is calculated by the vector calculation unit 8a based on the output result from the sensor unit 4.

The second work calculation unit 8c obtains the value of effective power Pe from the following equation, based on Mz component exerted to the crankset 102 by the pedaling operation of the user:

$$Pe=(Mzl-Mzr)\text{angular speed}$$

It is to be noted that, in the foregoing equation, Mzl and Mzr represent Mz component applied to the left crank and the right crank, respectively.

It is to be noted that, the total power Pt based on the pedal pedaling force Ft can be obtained by Pe=(Ftl–Ftr) angular speed. In the foregoing equation, Ftl and Ftr are the pedal pedaling forces applied to the left crank and the right crank, respectively. The values of the pedaling efficiency 52 and the numerical value display 53 shown in FIG. 10 may be based on the effective power Pe and the total power Pt.

As has been described above, when the power Pb of the bicycle based on the effective power Pe provided to the crankset 102 by the user and the traveling distance of the bicycle is obtained, the efficiency calculation unit 8d obtains the efficiency of the bicycle based on both the values. In the present embodiment, the efficiency of the bicycle is calculated by subtracting the power Pb of the bicycle from the effective power Pe provided by the user. This corresponds to the loss amount of force attributed to the bicycle. That is, since the efficient bicycle can efficiently use the force exerted by the user to rotate the crankset 102 for causing the bicycle to travel, the traveling speed becomes faster when the pedaling motion is performed with identical power.

It is to be noted that, the loss amount attributed to the bicycle also includes the effect of air resistance, the resistance on the road surface and the like. However, these effects can be reduced by performing measurement under common measurement conditions such as the same weather condition, the time and running speed at the average speed and the like, or by performing measurement indoors.

The pedaling motion measuring device according to the present embodiment can perform measurement of the vectors of force provided to the crankset independently of the right side and the left side, in the state where the user is riding and performing pedaling motion. Further, by deriving the vectors of force provided to the crankset and the running distance of the bicycle within a prescribed time, the user power provided by the user to the crank member within a unit time and the bicycle power performed by the bicycle within a unit time are calculated. From the difference between thus obtained results, the efficiency of the bicycle is calculated.

Further, in calculating the efficiency of the bicycle, the bicycle power Pb can be derived employing the distance as the reference. For example, the force provided to the crankset is measured while measuring the running distance by the wheel rotation sensor 22. Thereafter, at a time point where the bicycle has run a prescribed distance (for example, 1 km), the measurement of the prescribed force provided to the crankset is stopped, and the bicycle power Pb provided to the crankset by the running distance per unit time is calculated. Based on the power, the efficiency of the bicycle is measured.

With the pedaling motion measuring device according to the present embodiment, the efficiency of the bicycle can be obtained as an index value, based on the two types of work performed within a prescribed time. Further, when the parameter conditions for measurement are identical, the efficiency of the bicycle can be measured under the identical conditions. Therefore, the efficiency of the bicycle can be used for the performance evaluation of the parts of the bicycle, e.g., as the evaluation reference for determining whether or not a certain part fits to the user.

Second Embodiment

A pedaling motion measuring device according to a second embodiment of the present invention is structured identically to the pedaling motion measuring device according to the first embodiment, except for the structure of the crankset and the number of installed sensor units. In the following, a description will be given mainly of the differences.

The pedaling motion measuring device according to the embodiments of the present invention measures the distortion occurring at the crank arms 107 (107R, 107L), to thereby measure the force applied to the crankset 102 by the user. The measurement result is displayed on the display unit 11 of the calculation device 3 attached to the handlebar 108.

Figure 11:
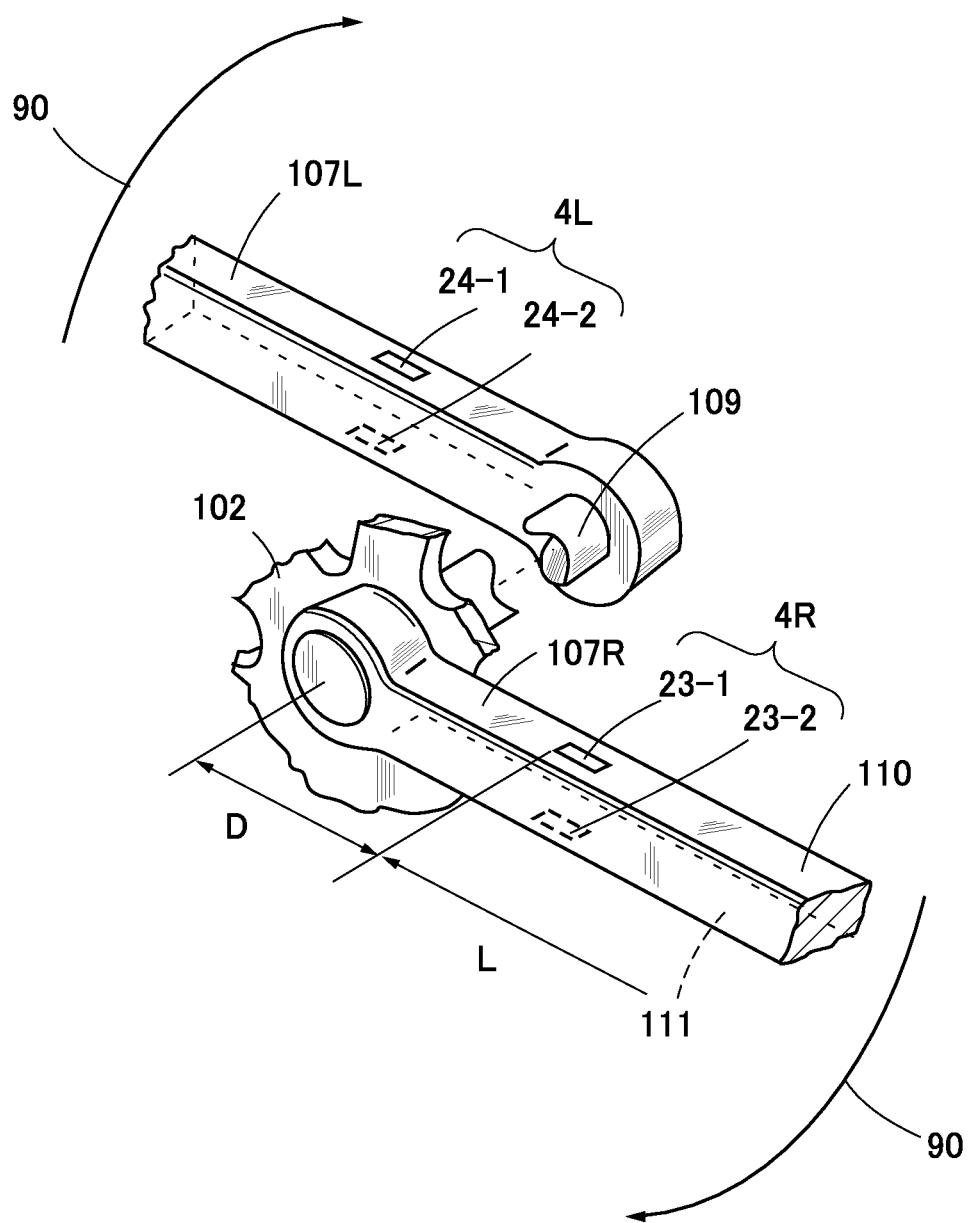
FIG. 11 is a partial enlarged perspective view of the crankset of the bicycle in which a measurement unit of a pedaling motion measuring device according to a second embodiment of the present invention is installed.

FIG. 11 is a partial enlarged perspective view of the crankset of the bicycle in which a measurement unit of a pedaling motion measuring device according to the second embodiment of the present invention is installed. In the present embodiment, a set of sensor units 4 (4R, 4L) is attached to each of the right and left crank arms 107 (107R, 107L). The sensor units 4 are each provided with a plurality of distortion sensors. When the right and left crank arms slightly deform by the external force, the distortion sensors similarly deform, which is associated with variations in electrical resistance and the like. This makes it possible to measure distortion of the crank arms.

As shown in FIG. 11, distortion sensors 23-1, 23-2, 24-1, and 24-2 included in the sensor units 4 (4R, 4L) are arranged on the faces 110 and 111 opposing to each other along the rotation direction 90 of the crank arms 107, so as to oppose to the direction crossing the rotation direction of the crank. Further, the two distortion sensors are arranged so as to oppose to each other in the substantially perpendicular direction with reference to the rotary shaft 109 of the crank of the crankset 102.

Figure 12:
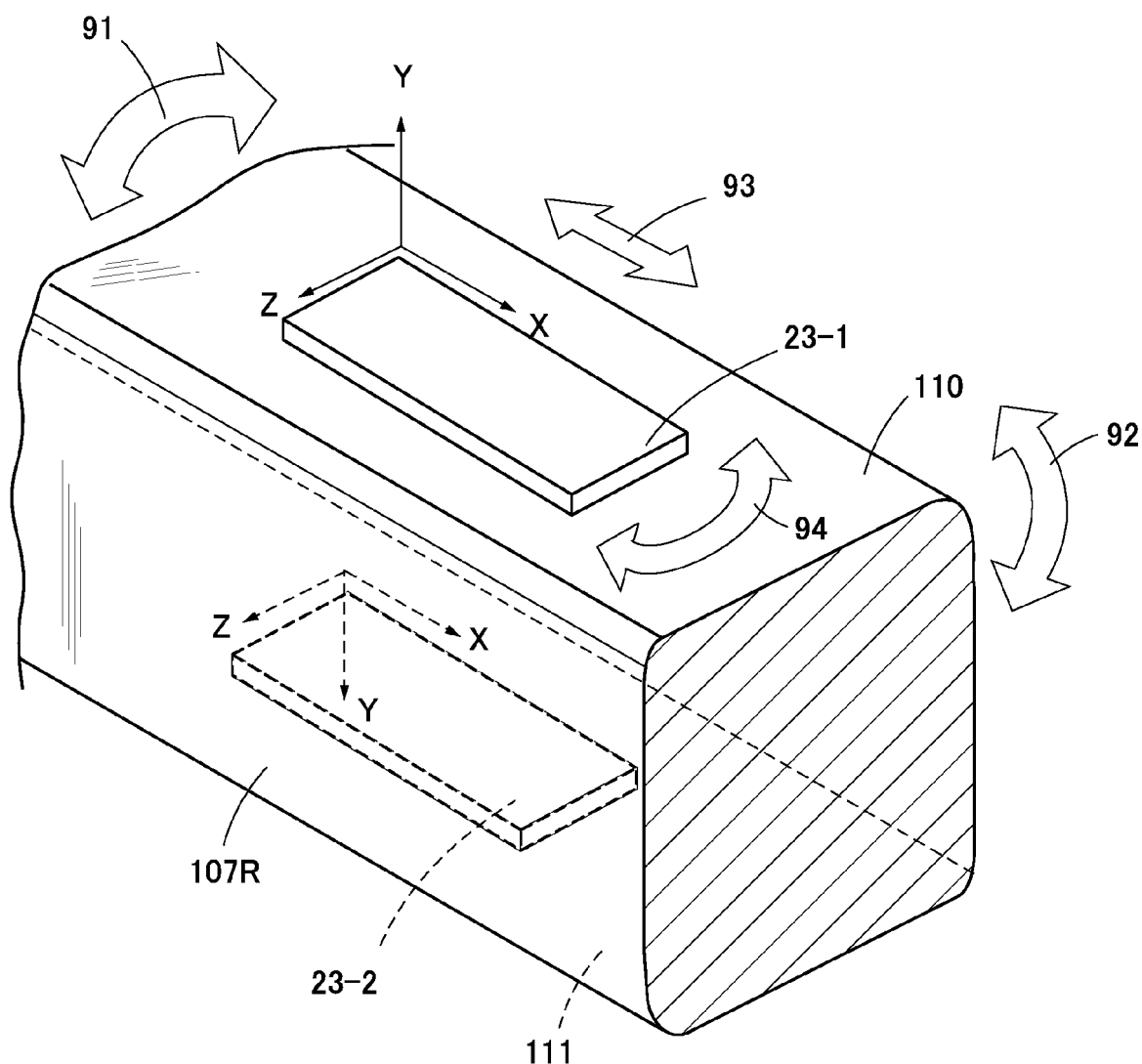
FIG. 12 is a diagram for describing distortions that can be measured by the distortion sensor shown in FIG. 11.

FIG. 12 is a diagram for describing the distortions that can be measured by the distortion sensors shown in FIG. 11. First, the XYZ three-axis directions of the distortion sensors will be defined. Since the position and orientation of the distortion sensors provided at the crank arms vary in accordance with the rotation of the crank arm as seen from the outside of the apparatus, as shown in FIG. 4, the reference of the XYZ coordinate system of the distortion sensor is set to the installation faces 110 and 111 of the crank arms where distortion sensors 23-1, 23-2, 24-1, and 24-2 are provided.

A description will be given of the XYZ coordinate system of the distortion sensor, taking up the two distortion sensors 23-1 and 23-2 of the right sensor unit 4R as the example. As shown in FIG. 12, the distortion sensor 23-1 is provided on the face 110 of each opposing face of the crank arm. This face is defined as XZ plane. X axis is the direction perpendicular to the rotary shaft 109 of the crank, and the direction away from the rotary shaft is the positive direction. Y axis is the direction along the normal to the installation face 110 of the crank arm, and the direction away from the installation face 110 is the positive direction. Z axis is parallel to the rotary shaft 109 of the crank, and the outward direction of the crank is the positive direction.

Further, the distortion sensor 23-2 is provided on the installation face 111 of the crank arm. This face is defined as XZ plane. In the distortion sensor 23-2, X axis and Z axis are similarly oriented as those in the distortion sensor 13-1. However, the positive/negative relationship is inverted as to Y axis, whose positive direction is the direction away from the installation face 111.

As has been described in the foregoing, the distortion sensors 23-1, 23-2, 24-1, and 24-2 measure the following 4-axis directional forces in the present embodiment. Specifically, what are measured are: the torsional distortion (a first directional displacement) that occurs about X axis upon receipt of the Y-axis directional force as shown by arrow 91 in FIG. 12; the torsional distortion (a second directional displacement)

that occurs about X axis upon receipt of the Z-axis directional force as shown by arrow 92; the distortion (a third directional displacement) being the expansion and compression in X axis direction upon receipt of the X-axis directional force as shown by arrow 93; and the torsional distortion (a fourth directional displacement) that occurs about Y axis upon receipt of the Z-axis directional force as shown by arrow 94.

Further, distance D from the hanger shaft 109 is not particularly limited. However, it is to be noted that, since the crank arm 107 is structured as a cantilever with reference to the rotary shaft 109 of the crank, while an increase in D can increase the displacement amount of the second directional displacement shown by arrow 92, the displacement amount of the third directional displacement shown by arrow 93 becomes small. Hence, in order to balance these displacement amounts, it is preferable to adjust the position of the distortion sensors as appropriate, in accordance with the property of the crank arms (Young's modulus) and the level of the user involved in the measurement.

In the present embodiment, the angle sensor 5 is structured with a slit disc, an optical sensor and the like provided at the crankset 102.

The transmission unit 6 transmits the output signals from the right and left sensor units 4 (4R, 4L), the angle sensor 5 and the magnetic sensor 51 to the calculation device 3. Of these signals, the signal output from the right and left sensor units 4 (4R, 4L) and the angle sensor 5 are used for measuring the magnitude and direction of the force applied to the crankset 102, and the output signal from the magnetic sensor 51 is used for measuring the bicycle efficiency whose description will follow. Though it is preferable that the communication means of the transmission unit 6 with the calculation device 3 is wireless communication, it may be wire communication.

First, a description will be given of the magnitude and direction of the force applied to the crankset 102.

The output signal transmitted from the transmission unit 6 is received by the reception unit 7 of the calculation device 3 as one example of the vector calculation unit, and is transmitted to the control calculation unit 8. The control calculation unit 8 calculates, based on the programs and various data stored in the device, the magnitude and direction of the force applied to each of the right and left crank arms 107R and 107L at their respective angle positions from the output signal.

Exemplary various data stored in the device include information on the property of the crank, information on the installation positions of the distortion sensors and the like.

The result calculated by the calculation device 3 is output via the display unit 11 and the speaker unit 12 by any means in the manner recognizable for the user.

It is to be noted that, the reference distortion information stored in the device is used for calculating the vectors of the force applied to each of the crank arms 107R and 107L. The reference distortion information is information of the sensor output value of the sensor units 4 corresponding to the distortions of the crank arms that occur when a certain force is applied in a certain direction at each angle position.

Figure 13:
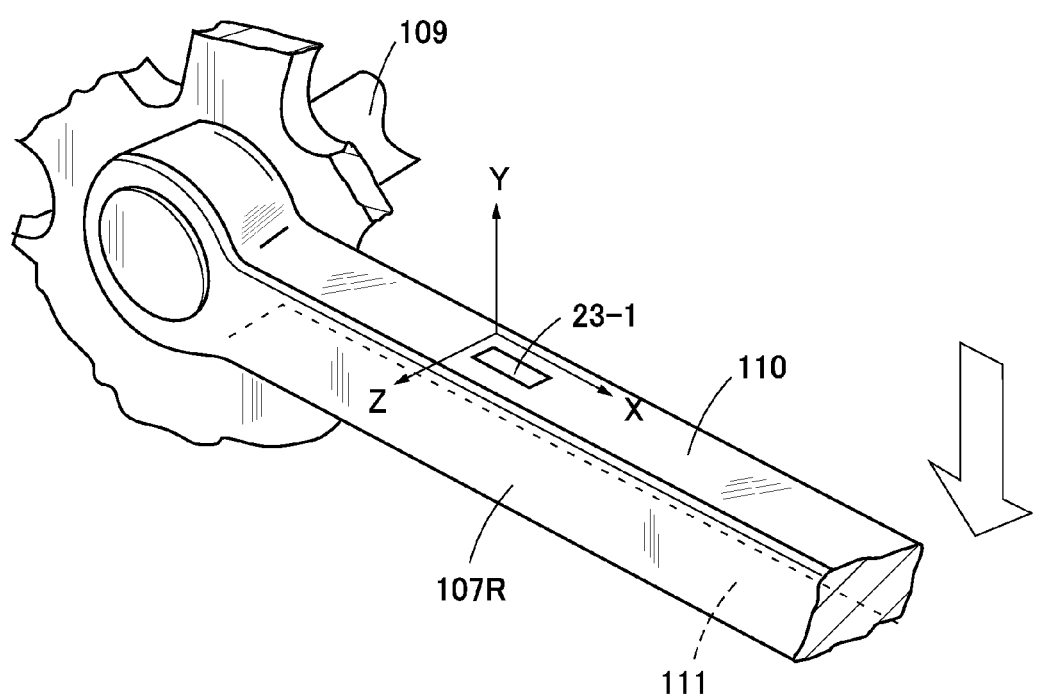
FIG. 13 is a schematic view of the force that is applied when reference distortion information is prepared.

FIG. 13 is a schematic view of the force that is applied when the reference distortion information is prepared. The magnitude of the applied force used in preparation of the reference distortion information may appropriately be selected according to the property of the crank arms. Further, though the direction of force is not particularly limited, it is the vertically downward direction in the present embodiment.

Figure 15:
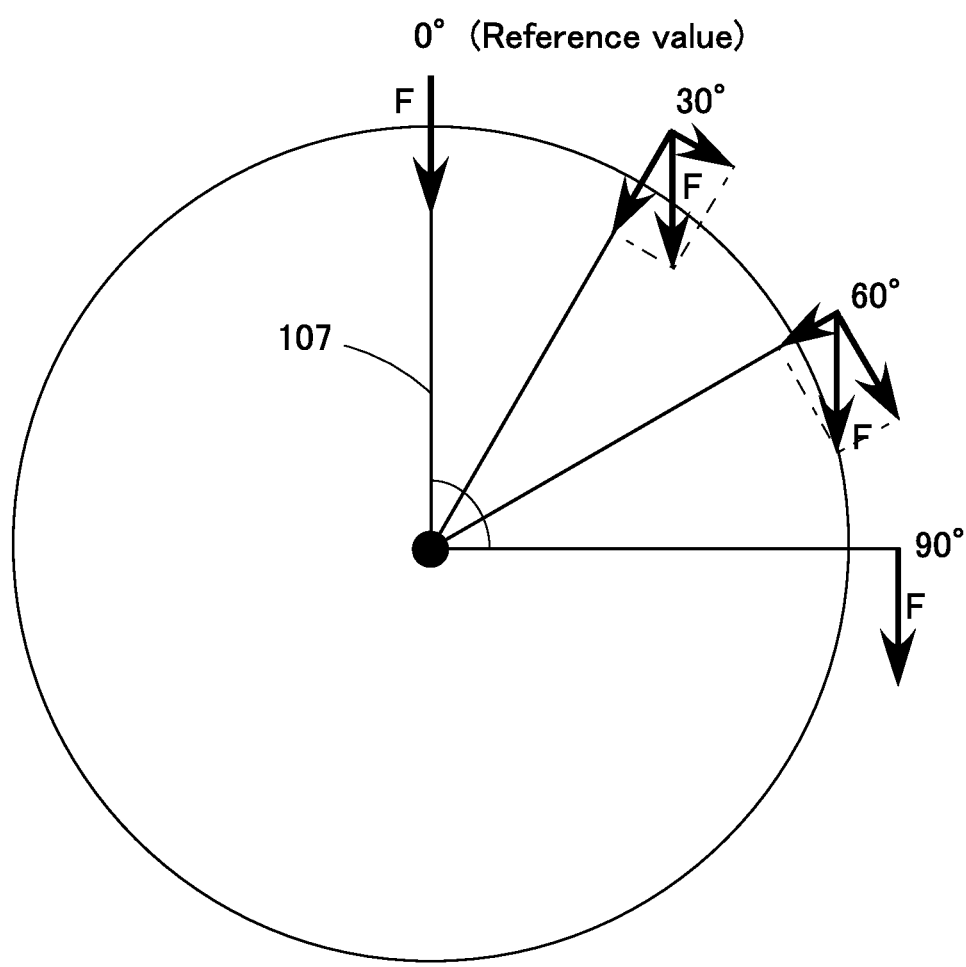
FIG. 15 is a diagram describing changes in the sensor output value in accordance with the angle position of the reference distortion information.

FIG. 14 shows one example of the reference distortion information of the right sensor unit 4R. FIG. 15 is a diagram describing changes in the sensor output value in accordance with the angle position of the reference distortion information. The reference distortion information is represented as the output values of the distortion sensors of the sensor units, based on the distortion of the crank arms when a certain force is applied in a certain direction to each of the pedals coupled to the crank arms. In the present embodiment, as to the two distortion sensors 13-1 and 13-2, the displacement amounts for the first to fourth directional displacements included in the sensor unit is recorded by 30 degrees in numerical values. It is to be noted that the displacement amount corresponding to each angle position of the reference distortion information is not necessarily recorded by 30, and may be recorded by arbitrary angles.

As shown in FIG. 15, at the reference position (0) positioned at the top dead center, when a certain force F is applied in the vertically downward direction, the crank arm 107 receives the force in the direction in which the crank arm 107 shrinks in its length direction. Thus, the value of the second directional displacement is very small, and the value of the third directional displacement becomes great. It is to be noted that, the displacement amount of the first directional displacement and that of the fourth directional displacement are generated because the force is applied to the pedal that outwardly projects from each of the crank arms 107.

In the range from the reference position being the top dead center to 90, as the angle position becomes greater, as shown in FIG. 15, the values of the first and second directional displacements become greater, while the values of the third and fourth directional displacements become smaller. When the angle position is 90, the value of the second directional displacement represents the maximum value, and the value of the third directional displacement represents the minimum value. In this manner, over 360, the values from the first to fourth directional displacements are measured. Thus, the reference distortion information is prepared.

Figure 16:
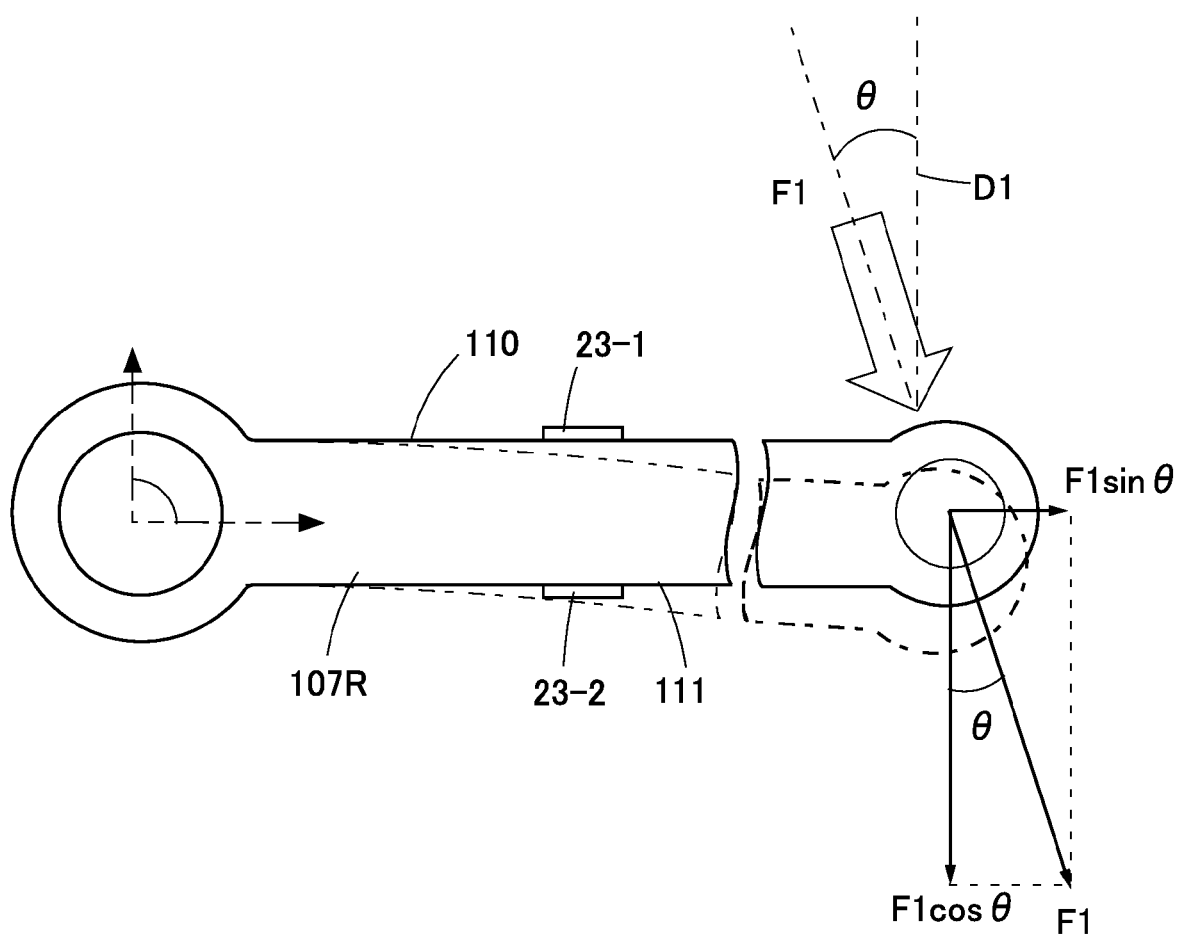
FIG. 16 is a diagram showing distribution of force throughout the directional displacements when the force is applied to the crank arm in the direction of angle.

Next, a description will be given of calculation of the vectors of the force exerted to the crankset 102 by the pedaling operation of the user. FIG. 16 shows the distribution of force throughout the directional displacements when the force is applied in the direction of angle.

As shown in FIG. 16, when force F1 is applied in the direction tilted by angle with reference to the reference direction D1 of the reference distortion information, the first directional displacement and the second directional displacement are displaced by F1 cos, and the third directional displacement is displaced by F1 sin.

By the force applied as being tilted by angle with reference to the reference direction D1, the first and second directional displacements of the first distortion sensor 23-1 become smaller and the third directional displacement becomes greater than those of the reference distortion information at the angle position 90.

Accordingly, by comparing the angle position of each crank arm measured by the angle sensor, the reference distortion information, and the output value of the distortion sensors of each sensor unit being output by the force applied by the user, the vectors of the force applied by the user can be calculated.

For example, as shown in FIG. 16, in the case where the angle position of the crank arm measured by the angle sensor is 90, and a force tilted by angle with reference to the reference direction D1 is applied to the crank arm positioned at that angle position, the value of F1 sin can be calculated by comparing the reference distortion information of the first and the fourth directional displacements at that angle position (90) and the output values from the distortion sensors against each other.

Further, since the proportion of the second directional displacement and the third directional displacement is different depending on the tilt angle, by comparing the ratio of the output value of the second directional displacement and that of the third directional displacement of the distortion sensors, the value of tilt angle can be derived. Further, by the value of the output value, the magnitude of force F1 can be calculated.

In this manner, by comparing the reference distortion information and the output values of the distortion sensors at each angle position, the vectors of force F1 are calculated.

The output example representing the vectors of force applied by the user calculated by the pedaling motion measuring device according to the present embodiment is similar to the output example of the first embodiment, which is shown in FIG. 10.

Next, a description will be given of measurement of the bicycle efficiency. The bicycle efficiency is measured as to how efficiently the work applied to the crankset is used for allowing the bicycle to travel, based on the work provided to the crankset 102 by the user and the distance traveled by the bicycle. The work provided to the crankset 102 by the user is calculated based on the magnitude and direction of the force applied to the crankset 102 which is derived as described above, and the distance traveled by the bicycle is calculated based on the number of rotation of the rear wheel 104 of the bicycle.

It is to be noted that, the calculation of the work provided to the crankset 102 by the user and the distance traveled by the bicycle is the same as in the first embodiment.

In the present embodiment, the efficiency of the bicycle is calculated by obtaining the ratio between the power which is derived by dividing the force provided to the crankset 102 by the user by the unit time and the power which is derived by dividing the traveling distance of the bicycle by the unit time.

Third Embodiment

A pedaling motion measuring device according to a third embodiment of the present invention is structured identically to the pedaling motion measuring device according to the second embodiment, except for the structure of the crankset and the number of installed sensor units. In the following, a description will be given mainly of the differences.

Figure 17:
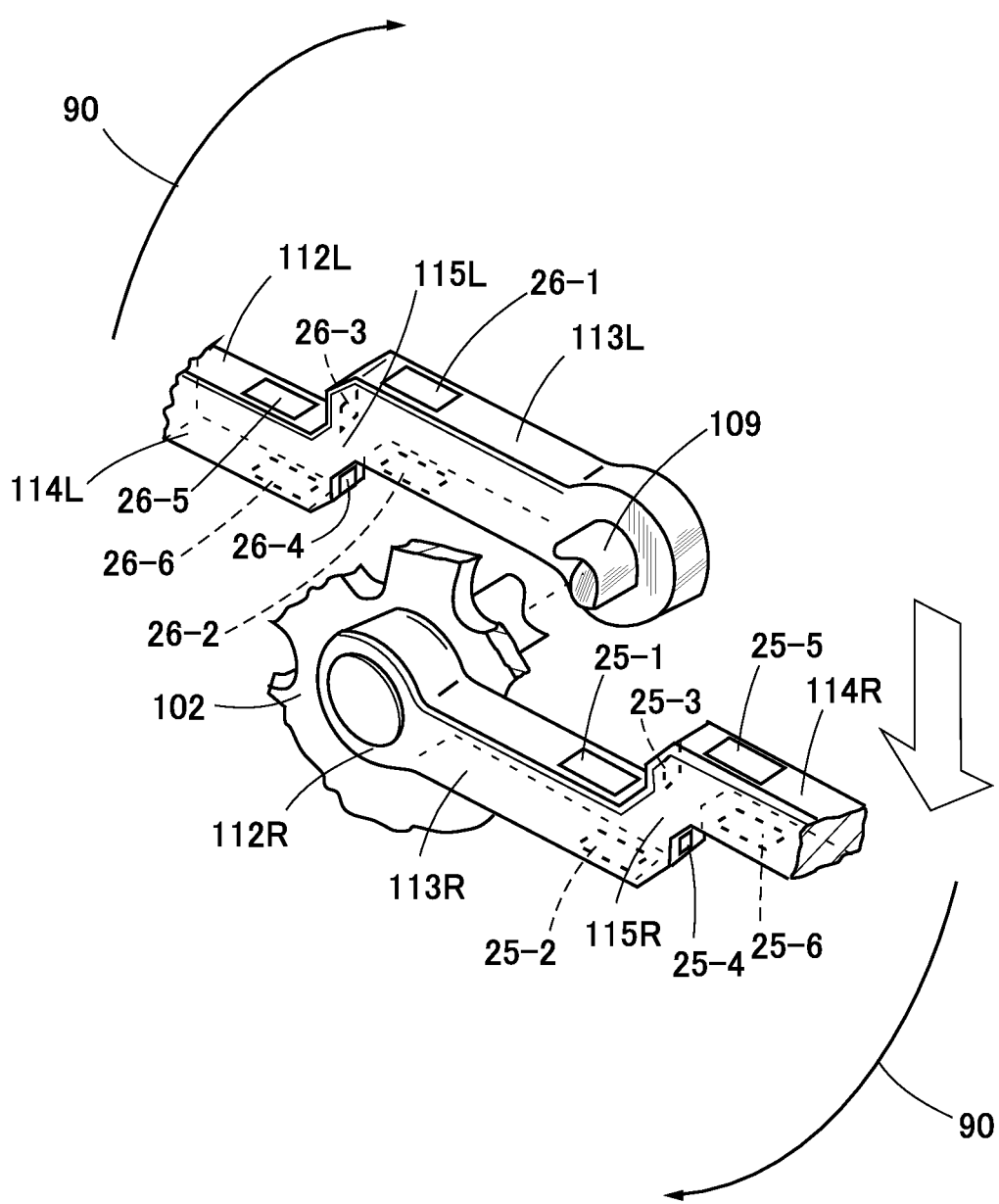
FIG. 17 is a partial enlarged perspective view of the crankset of the bicycle in which the measurement unit of the pedaling motion power meter according to the second embodiment of the present invention is installed.

As shown in FIG. 17, each of the crank arms 112 of the crankset according to the present embodiment has a bent structure, which includes a first straight portion 113 and a second straight portion 114 extending in the radial direction from the hanger shaft 109, and a bent portion 115 at the intermediate portion of the straight portions that is perpendicular to the radial direction of the hanger shaft 109. The bent portion 115 may be structured to have different thickness dimension as compared to the straight portions 113 and 114, e.g., to be thinner than them.

As to the sensor units, three sets, i.e., six pieces in total, of distortion sensors 25 and three sets, i.e., six pieces in total, of distortion sensors 26 are respectively provided to the right and left crank arms 112R and 112L. The three sets are respectively provided to the first and second straight portions 113 and 114 and the bent portion 115.

Thus, by providing the distortion sensors at three sites differing in extending directions from one another, the sites where the stress is focused are different from one another in accordance with the angle position of the crank arm. Thus, it becomes easier to detect the distortion amounts of the distortion sensors at every angle position.

Figure 18:
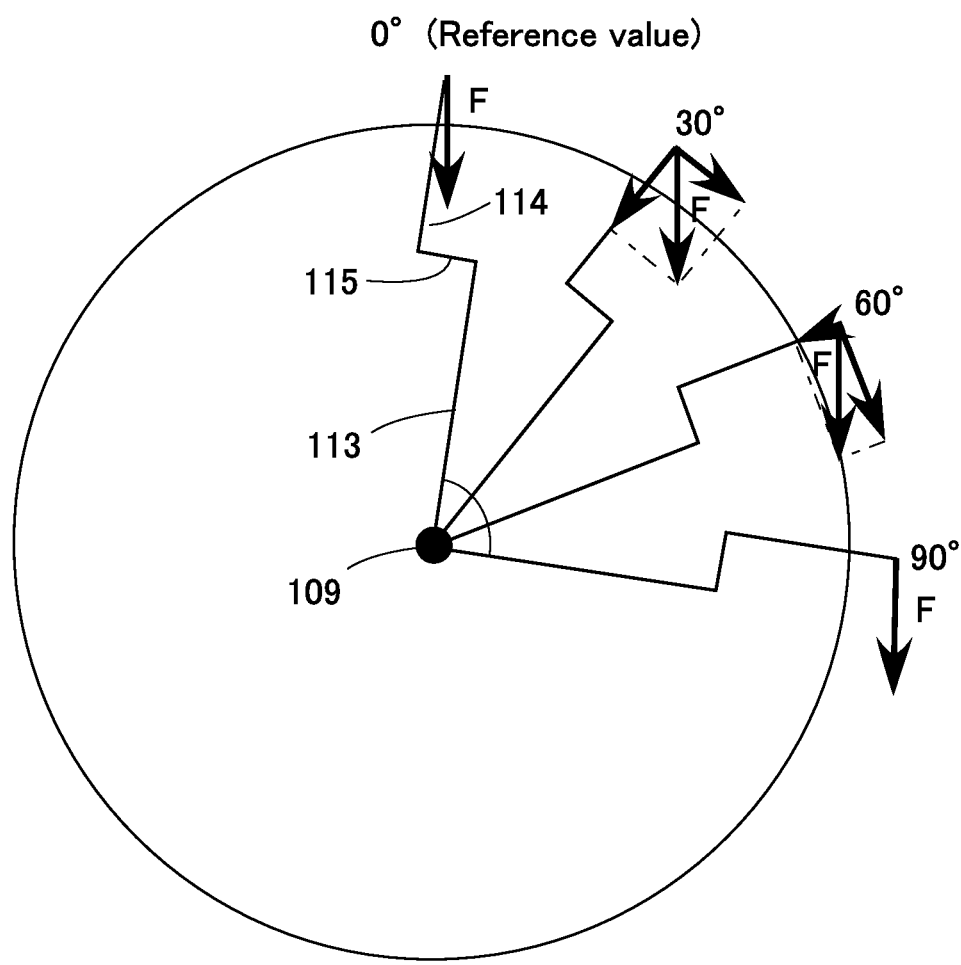
FIG. 18 is a diagram describing changes in the sensor output value in accordance with the angle position of the reference distortion information.
Figure 19:
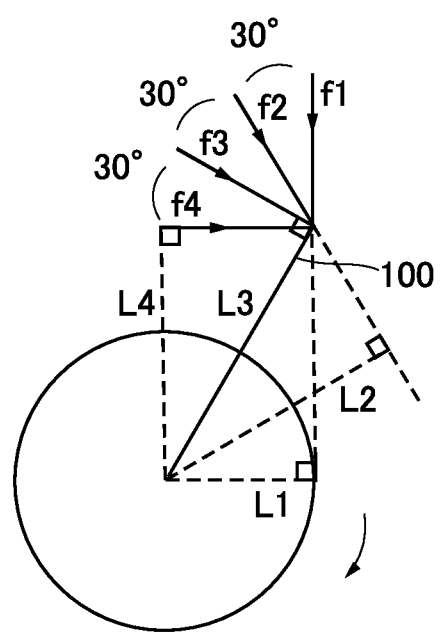
FIG. 19 is a diagram describing changes in the rotation efficiency of the crank by the changes in the direction of a force exerted to the crank.

FIG. 18 is a diagram describing changes in the sensor output value in accordance with the angle position of the reference distortion information. In the present embodiment, the angle position is specified by the extending direction of the first straight portion 113. Hence, as shown in FIG. 18, the force in the vertically downward direction applied to the pedal at the reference angle (0) position is not at immediately above the hanger shaft 109. Accordingly, in the reference distortion information at the position at the reference position (0), the distortion amounts of the distortion sensors 25-3, 25-4, 26-3, and 26-4 provided at the bent portions 115 become great, and the distortion amounts of the distortion sensors 25-1, 25-2, 25-5, 25-6, 26-1, 26-2, 26-5, and 26-6 provided to the straight portions 113 and 114 become small.

On the other hand, as the reference angle increases, the distortion amounts of the distortion sensors 25-1, 25-2, 25-5, 25-6, 26-1, 26-2, 26-5, and 26-6 provided at the straight portions 113 and 114 become greater, and the distortion amounts of the distortion sensors 25-3, 25-4, 26-3, and 26-4 provided at the bent portions 115 become smaller.

Thus, in the present embodiment, by using the distortion sensors differing in installed directions from one another, the distortion sensors to which stress is focused can be varied from one another in accordance with the angle position. Thus, the distortion amount can be increased at every angle position, and the distortion amounts can be calculated more precisely.

As has been described in the foregoing, with the pedaling motion measuring device of the present invention, by providing the sensor units to each of the right and left crank arms, the vectors of the force applied to the crankset can be measured for the right side and the left side independently of each other.

Further, being different from the pedals, since the crank does not greatly vary among the types of bicycle such as road racing bicycles, touring bicycles, racing bicycles and the like, the pedaling motion measuring device of the present invention can widely be applied.

It is to be noted that the present invention is not limited to the embodiments described above, and can be practiced in various other manners.

For example, though the pedaling motion measuring device according to each of the present embodiments is provided to the bicycle for traveling, it can be used for a cycling fitness machine. Further, the pedaling motion measuring device can be used as a measuring device for measuring the vectors of force applied to the crankset.

The calculation device 3 according to each of the present embodiments may not be attached to the handlebar of the bicycle, but instead, may be structured by a computer. Further, it is also possible to structure such that the calculation device 3 of the present embodiment and the computer can communicate with each other, so that the measurement result may be analyzed in more detail by the computer.

Further, as to the bent portion provided at each of the intermediate sites, such as each crank arm according to the third embodiment, it is not limited to those being bent in the direction along the rotation direction of the crank arm. Instead, the bent portion may be provided in the manner as being bent in the direction crossing the rotation direction (the direction projecting outward with reference to the hanger shaft).

INDUSTRIAL APPLICABILITY

The present invention can be used in determining the efficiency of the pedaling motion of bicycles for traveling or cycling fitness machines.

It is to be noted that, the present invention is not limited to the embodiments described above, and can be practiced in various modes.

It is to be noted that any combinations of the embodiments described above can achieve their respective effects.

In the first embodiment, though distance A from X axis to the point of effort is calculated based on the value previously stored in order to convert the pedaling forces Fmx and Fmy at the point of effort, value A can be interpolated based on values My and Fz.

Specifically, since My is the value obtained by multiplying Fz by straight distance k which is from the sensor center to the point of effort, the relationship k=My/Fz is established. Further, since $k=(A^2+L^2)^{1/2}$, $A=(k^2-L^2)^{1/2}$.

Accordingly, it can be calculated from $A=((My/Fz)^2-L^2)^{1/2}$. By using this, Fmx and Fmy may be calculated as follows:

$$Fmx=Mx/((My/Fz)^2-L^2)^{1/2}$$

$$Fmy=My/(((My/Fz)^2-L^2)+L^2)^{1/2}$$

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

The invention claimed is:

1. A pedaling motion measuring device comprising:
a measurement body unit that has second sensor units arranged on a bicycle provided with a crank member having a right and left crank arms each connected between a hanger shaft and each of a pair of pedals, each of the pedals rotating with respect to a pedal shaft parallel to the hanger shaft, each of the crank arms angled with respect to the pedal shaft and the hanger shaft, the second sensor units sensing magnitude and direction of a force applied to each of the right and left crank arms;
a second work calculation unit that calculates user's work provided to the crank member by the user, based on the magnitude and direction of the force applied to each of the right and left crank arms and sensed by the second sensor units,
wherein the second sensor units each include an angle sensor measuring angle positions of corresponding one of the crank arms rotated by an operation of the user, and a plurality of force sensors each measuring a force applied to the crank member based on a distortion of the crank member, the second sensor units outputting information on the force applied to the crank member in association with the angle positions of the crank arms,
wherein the second work calculation unit calculates magnitude and direction of the force applied to the crank member by comparing reference distortion information previously stored as an output value of each of the force sensors when a certain force is applied from a certain direction to each of the crank arms at each of the angle positions against an output value from each of the force sensors.

2. The pedaling motion measuring device according to claim 1, wherein
the second work calculation unit calculates the user's work, based on a value of a force applied in a rotation tangential direction of each of the right and left crank arms.

3. The pedaling motion measuring device according to claim 1, wherein
a plurality of the force sensors of the second sensor units are radially arranged about a rotation center of the hanger shaft between the right and left crank arms and the hanger shaft.

4. The pedaling motion measuring device according to claim 1, wherein
the second sensor units are each structured with a 6-axis sensor that can measure 3-axis directional forces and 3-axis directional moments being perpendicular to one another.

5. The pedaling motion measuring device according to claim 1, wherein
a plurality of the force sensors of the second sensor units are each a capacitive force sensor.

6. The pedaling motion measuring device according to claim 1, further comprising
a vector calculation unit that calculates magnitude and direction of the force applied to the crank member by an operation of the user, based on an output from each of the sensor units.

7. The pedaling motion measuring device according to claim 6, wherein
the vector calculation unit calculates magnitude of a force of a particular component out of the entire force applied to the crank member.

8. The pedaling motion measuring device according to claim 1, wherein
the force sensors are provided at opposing faces along rotation directions of the respective crank arms so as to oppose to each other in a direction crossing a rotary shaft of the crank member.

9. The pedaling motion measuring device according to claim 1, wherein
the crank arms each include a straight portion along a radial direction of a rotary shaft of the crank member and a crossing portion extending to cross the radial direction of the rotary shaft of the crank member; and
the sensors of the second sensor units are provided to each of the straight portion and the crossing portion.

10. The pedaling motion measuring device according to claim 1, comprising:
a first sensor unit for sensing a number of rotation of a wheel by sensing a motion of the wheel of the bicycle;
a first work calculation unit that calculates work performed by the bicycle based on the number of rotation of the wheel sensed by the first sensor unit; and
an efficiency calculation unit that calculates an efficiency of the bicycle based on the work of the bicycle calculated by the first work calculation unit and the user's work calculated by the second work calculation unit.

11. The pedaling motion measuring device according to claim 10, wherein
the first work calculation unit calculates the work of the bicycle based on information on a distance traveled by the bicycle, the information being based on the number of rotation of the wheel.

12. The pedaling motion measuring device according to claim 10, wherein
the first sensor unit comprises: a magnetic element provided at the wheel of the bicycle; and a rotation sensor provided on a frame of the bicycle.

13. The pedaling motion measuring device according to claim 1, wherein said plurality of the force sensors are arranged at the right and left crank arms.

14. The pedaling motion measuring device according to claim 1, wherein said plurality of the force sensors are arranged at supporters fixed to the right and left crank arms.

15. A pedaling motion sensor device, comprising:
- an angle sensor that measures angle positions of crank arms of a crank member relative to a rotation center of a hanger shaft being rotated by an operation of a user;
- a sensor unit that is provided with a plurality of force sensors arranged radially about the rotation center of the hanger shaft and is placed between the right and left crank arms and the hanger shaft; and
- a vector calculation unit that calculates magnitude and direction of a force applied to the crank member by the operation of the user, by associating positional information measured by the angle sensor and an output of each of the force sensors of the sensor unit with each other.

* * * * *